US008929655B2

(12) United States Patent
Takeuchi

(10) Patent No.: US 8,929,655 B2
(45) Date of Patent: Jan. 6, 2015

(54) IMAGE EVALUATION APPARATUS AND CAMERA

(75) Inventor: Hiroshi Takeuchi, Tokyo (JP)

(73) Assignee: Nikon Corporation, Tokyo (JP)

( * ) Notice: Subject to any disclaimer, the term of this patent is extended or adjusted under 35 U.S.C. 154(b) by 1195 days.

(21) Appl. No.: 12/588,398

(22) Filed: Oct. 14, 2009

(65) Prior Publication Data

US 2010/0149361 A1   Jun. 17, 2010

(30) Foreign Application Priority Data

Oct. 16, 2008   (JP) .................................. 2008-267499
Oct. 14, 2009   (JP) .................................. 2009-237106

(51) Int. Cl.
| G06K 9/00 | (2006.01) |
|---|---|
| G06K 9/68 | (2006.01) |
| H04N 5/235 | (2006.01) |
| G06T 7/20 | (2006.01) |
| G06T 7/00 | (2006.01) |
| H04N 21/44 | (2011.01) |
| H04N 21/433 | (2011.01) |
| H04N 1/21 | (2006.01) |
| H04N 21/418 | (2011.01) |
| H04N 21/4223 | (2011.01) |
| H04N 5/77 | (2006.01) |
| H04N 5/14 | (2006.01) |

(52) U.S. Cl.
CPC ........... *H04N 1/2112* (2013.01); *H04N 5/2353* (2013.01); *G06T 2207/30168* (2013.01); *G06T 7/2013* (2013.01); *G06T 7/0002* (2013.01); *H04N 21/44008* (2013.01); *H04N 21/4334* (2013.01); *H04N 21/4184* (2013.01); *G06T 2207/10016* (2013.01); *H04N 21/4223* (2013.01); *H04N 5/772* (2013.01); *H04N 5/144* (2013.01)

USPC ............ 382/168; 382/170; 382/181; 382/219

(58) Field of Classification Search
USPC ......... 382/155, 160, 168, 170, 171, 172, 181, 382/217, 218, 219, 220, 221
See application file for complete search history.

(56) References Cited

U.S. PATENT DOCUMENTS

| 6,078,618 | A | * | 6/2000 | Yokoyama et al. ............ 375/240 |
|---|---|---|---|---|
| 6,389,168 | B2 | * | 5/2002 | Altunbasak et al. .......... 382/224 |

(Continued)

FOREIGN PATENT DOCUMENTS

| JP | A-2000-209468 | 7/2000 |
|---|---|---|
| JP | A-2000-259833 | 9/2000 |

(Continued)

OTHER PUBLICATIONS

Oct. 29, 2013 Notice of Allowance issued in Japanese Patent Application No. 2009-237106.
May 21, 2013 Office Action issued in Japanese Patent Application No. 2009-237106 (with translation).

*Primary Examiner* — Twyler Haskins
*Assistant Examiner* — Peter Chon
(74) *Attorney, Agent, or Firm* — Oliff PLC

(57) ABSTRACT

To provide an image evaluation apparatus and camera which are capable of evaluating an image which is comprehensively good. An image evaluation apparatus comprising: a storage portion which stores a plurality of images when an imaging portion of a camera has continuously imaged in a predetermined time interval a plurality of frames of a subject in a photographing area of the camera, and an image evaluation portion which evaluates a plurality of the images stored in the storage portion, based on a characteristic amount showing a state in which the subject in the photographing area changing in chronological sequence, when the plurality of the images is imaged.

5 Claims, 27 Drawing Sheets

(56) References Cited

U.S. PATENT DOCUMENTS

| | | | |
|---|---|---|---|
| 7,711,210 B2 | 5/2010 | Hosoda et al. | |
| 8,125,542 B2 * | 2/2012 | Ishikawa | 348/240.99 |
| 2003/0068100 A1 * | 4/2003 | Covell et al. | 382/305 |
| 2008/0219564 A1 * | 9/2008 | Covell et al. | 382/224 |

FOREIGN PATENT DOCUMENTS

| | | |
|---|---|---|
| JP | A-2005-277981 | 1/2005 |
| JP | A-2005-167377 | 6/2005 |
| JP | A-2008-165700 | 7/2008 |
| JP | A-2008-182544 | 8/2008 |

* cited by examiner

101

101

101

101

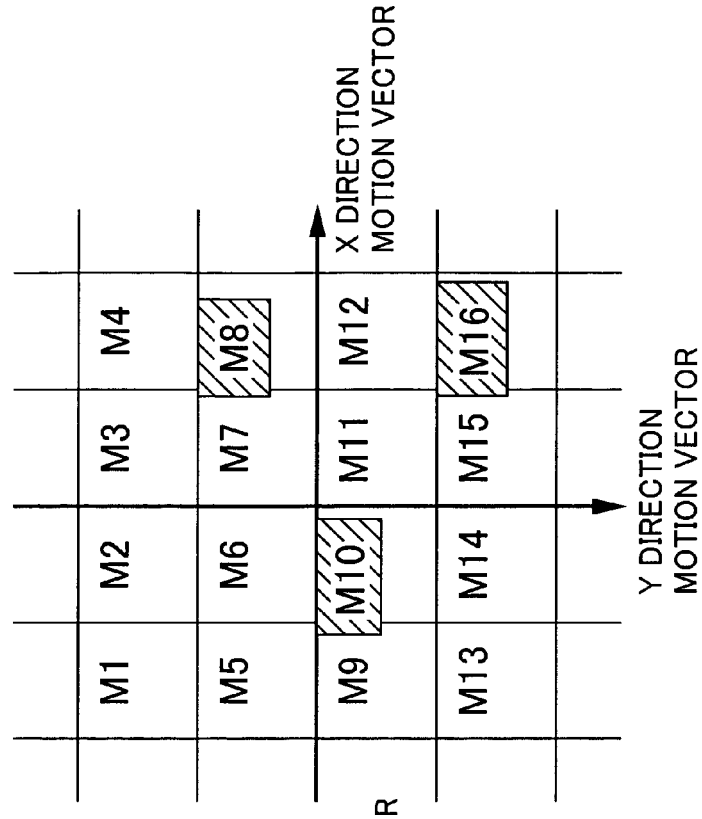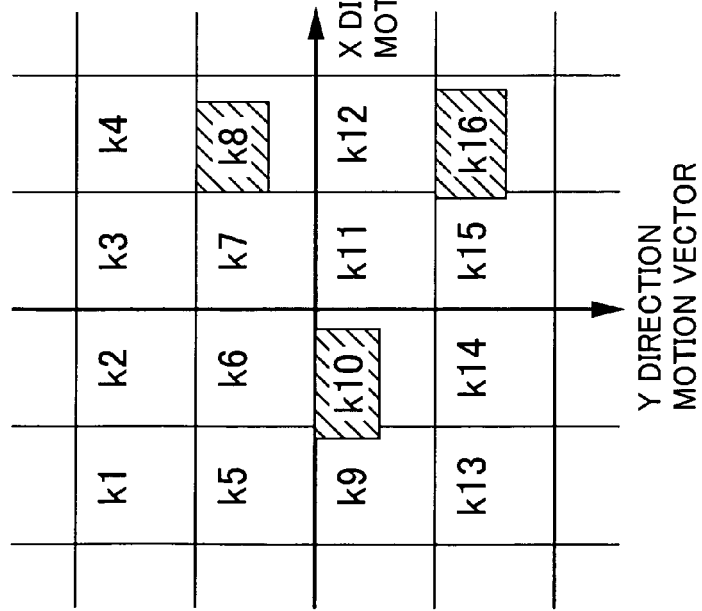

FIG. 16A
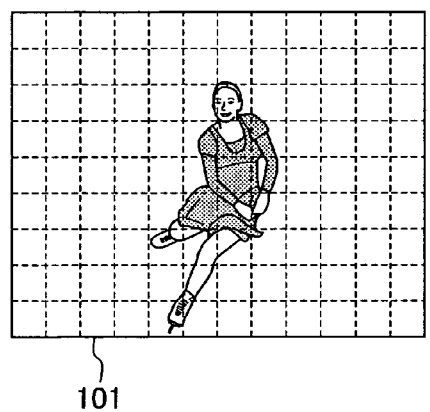 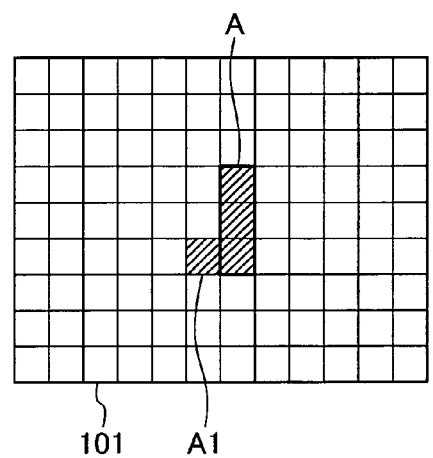
FIG. 16B
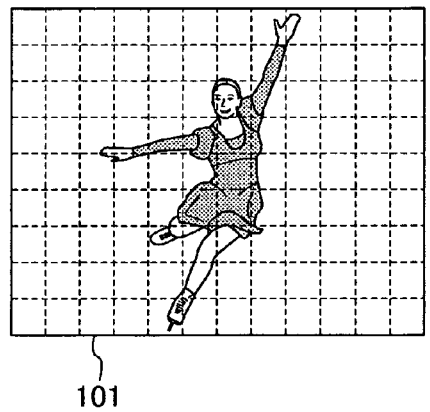 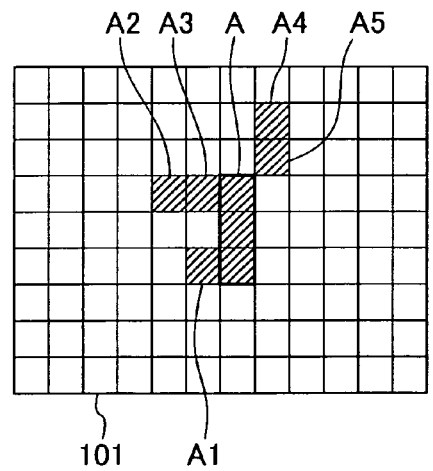

FIG. 22
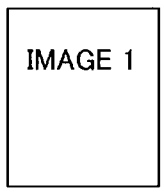 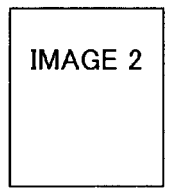 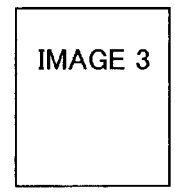 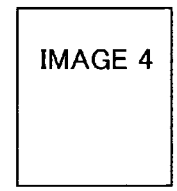 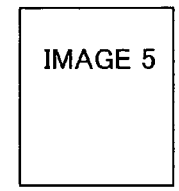
IMAGE 1   IMAGE 2   IMAGE 3   IMAGE 4   IMAGE 5
A : 70    A : 90    A : 90    A : 85    A : 95
B : 90    B : 60    B : 70    B : 60    B : 60
C : 60    C : 40    C : 50    C : 70    C : 50

FIG. 23
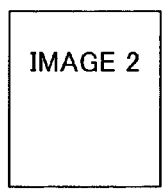
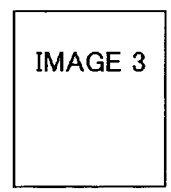
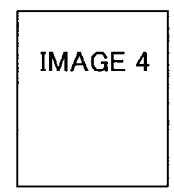
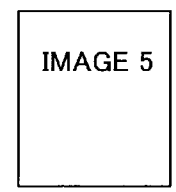
A : 70   A : 90   A : 80   A : 50   A : 70
B : 90   B : 60   B : 90   B : 85   B : 60
C : 60   C : 40   C : 70   C : 70   C : 90

IMAGE EVALUATION APPARATUS AND CAMERA

BACKGROUND OF THE INVENTION

1. Field of the Invention

The present invention relates to an image evaluation apparatus for evaluating an image photographed by a camera, and to a camera provided with this image evaluation apparatus.

2. Description of the Related Art

In the prior art, an image evaluation apparatus which analyzes and automatically evaluates a photographed image and automatically selects a preferable image is known (for example, refer to Japanese Unexamined Patent Publication No. 2000-259833).

SUMMARY OF THE INVENTION

The automatic evaluation of the prior art does not carry out an evaluation of the overall image, such as selection of an image recognizing the characteristics of the face. Because of this, it does not necessarily select a comprehensively good image. In this situation, it is desirable to comprehensively evaluate good images.

The objective of the present invention is to provide an image evaluation apparatus and camera which are capable of evaluating an image which is comprehensively good.

According to one aspect of the present invention, there is provided an image evaluation apparatus comprising: a storage portion which stores a plurality of images when an imaging portion of a camera has continuously imaged in a predetermined time interval a plurality of frames of a subject in a photographing area of the camera, and an image evaluation portion which evaluates a plurality of the images stored in the storage portion, based on a characteristic amount showing a state in which the subject in the photographing area changing in chronological sequence, when the plurality of the images is imaged.

The image evaluation portion may calculate, from a plurality of the images stored in the storage portion, a frequency distribution of motion vector arising between frames of each segmented region when each image is segmented into a plurality of segmented regions, and evaluate the frequency distribution of the motion vectors as the characteristic amount.

The storage portion may store a defocus amount of each image along with the image, the defocus amount is the one obtained when a plurality of the images have been imaged, and the image evaluation portion calculates, from a plurality of the images stored in the storage portion, a frequency distribution of a state of change in the defocus amount arising between frames of each segmented region when each image is segmented into a plurality of segmented regions, and evaluates the frequency distribution of the state of change of the defocus amount as the characteristic amount.

The storage portion may store a defocus amount of each image along with the image, the defocus amount is the one obtained when a plurality of the images have been imaged, and the image evaluation portion calculate, from a plurality of the images stored in the storage portion, a relative motion state in the photographing area of the subject, based on changes of the defocus amount detected at a plurality of focus detection positions set in the photographing area, and evaluate the relative motion state as the characteristic amount.

The image evaluation portion, from a plurality of the images stored in the storage portion, may calculate a number of peak frequencies which form a frequency distribution of motion vector arising between frames of each segmented region when each image is segmented into a plurality of segmented regions, and which have a frequency equal to or greater than a threshold frequency, and carry out the evaluation based on the number of the peak frequencies, and the image evaluation portion give a relatively higher evaluation with respect to other images, for an evaluation of an image imaged within a predetermined time from the change of the number of the peak frequencies which form the frequency distribution of the motion vectors and which have a frequency equal to or greater than the threshold frequency The image evaluation portion may evaluate an image stored in the storage portion based on the characteristic amount, and the main subject estimated from the image.

The image evaluation portion, from a plurality of the images stored in the storage portion, may calculate as the characteristic amount a frequency distribution of motion vector arising between frames of each segmented region when each image is segmented into a plurality of segmented regions, and also carry out the evaluation based on similarity between the frequency distribution of the motion vectors and a model frequency distribution of motion vector set beforehand as an evaluation standard of a preferable image.

The image evaluation portion may carry out the evaluation based on similarity between the frequency distribution of the motion vectors in a region in a vicinity of the center of the image, and the model frequency distribution of the motion vectors set beforehand as an evaluation standard of a preferable image in the region in the vicinity of the center of the image.

The image evaluation portion may calculate as the characteristic amount the frequency distribution of the motion vectors for a region in the vicinity of the center of the image, which has similarity of a color to a region and is not background, and which has continuity of the color with that region.

The image evaluation portion may delete motion components of a photographing area included in the frequency distribution of the motion vectors.

The image evaluation portion may convert the frequency distribution of the motion vectors and the model frequency distribution of the motion vectors into respective two dimensional graphs, and also segments developed regions of the two dimensional graphs into a plurality of segmented regions, calculate an absolute value of a frequency difference for each corresponding segmented region for the frequency distribution of the motion vectors and the model frequency distribution of the motion vectors set beforehand as an evaluation standard of a preferable image, which have been converted into two dimensional graphs, and takes the sum of the absolute values as the similarity.

The image evaluation portion may take as the characteristic amount a dispersion in a frequency distribution of motion vector arising between frames of each segmented region when the image is segmented into a plurality of segmented regions, and carry out evaluation based on similarity between the dispersion in the frequency distribution of the motion vectors and a dispersion in a model frequency distribution of motion vector set beforehand as an evaluation standard of a preferable image.

The image evaluation portion, from among the frequency distributions of the motion vectors may calculate from a plurality of the images, extracts a frequency distribution of the motion vectors formed based on a peak frequency having a frequency amount equal or greater than a threshold frequency, and carry out evaluation based on similarity between the dispersion of the frequency distribution of the motion vectors and the dispersion in the model frequency distribution of the motion vectors set beforehand as an evaluation standard of a preferable image.

The image evaluation portion may calculate, from a plurality of the images stored in the storage portion, a frequency distribution of motion vector arising between frames of each segmented region when each image is segmented into a plurality of segmented regions, and also extracts the frequency distribution of the motion vectors formed by a peak frequency having a frequency amount equal to or greater than a threshold frequency, and carry out evaluation based on a change amount of the frequency amount of the peak frequency included in the frequency distribution of the motion vectors, and an evaluation standard of the change amount of the frequency amount.

The image evaluation portion may update the model frequency distribution of the motion vectors set beforehand as an evaluation standard of a preferable image, based on a trend of the frequency distribution of the motion vectors of an image selected by a user, from among the images subjected to the evaluation.

The image evaluation portion may update the dispersion of the model frequency distribution of the motion vectors set beforehand as the evaluation standard of a preferable image, based on a trend in the dispersion of the frequency distribution of the motion vectors of an image selected by a user, among the images subjected to the evaluation.

The image evaluation portion may update a frequency amount of a peak frequency included in the model frequency distribution, used when defining the model frequency distribution of the motion vectors set beforehand as the evaluation standard, based on a frequency amount of a peak frequency included in the frequency distribution of the motion vectors of an image selected by the user, among the images subjected to the evaluation.

The image evaluation portion may update the threshold frequency when extracting the frequency distribution of the motion vectors formed by the peak frequency having a frequency amount greater than the threshold frequency, based on the frequency amount of the peak frequency included in the frequency distribution of the motion vectors of an image selected by a user from among the images which have been subjected to the evaluation.

The image evaluation portion may update the evaluation standard based on the change amount of the frequency amount of the peak frequency included in the frequency distribution of the motion vectors of an image selected by a user, from among the images subjected to the evaluation.

The image evaluation portion may comprise a system which evaluates one image using a plurality of evaluation methods which differ from each other, and for a plurality of the images which are subjects of the evaluation, for the case of a predetermined plurality of continuous images having higher evaluations by a same evaluation method than evaluations by the other evaluation methods, the evaluation with respect to the plurality of the images is carried out such that the evaluation according to the same evaluation method is higher than the evaluation by the other evaluation methods.

The image evaluation portion may comprise a system which evaluates one image using a plurality of evaluation methods which differ from each other, and an evaluation with respect to the plurality of the images is carried out such that an evaluation by an evaluation method which assigns a higher evaluation than the other evaluation methods, and further which has the highest percentage of high evaluations with respect to a plurality of the images among the plurality of evaluation methods, is made to have a relatively higher evaluation than the evaluations by the other evaluation methods.

The image evaluation portion may comprise a system which evaluates one image using a plurality of evaluation methods which differ from each other, and for a plurality of the images subjected to the evaluation, an evaluation method with a high evaluation with respect to a selected image for which a selection indication was made by a user, is made to have a relatively higher evaluation than the other evaluation methods, and the evaluation of the images other than the selected image is carried out.

The image evaluation portion may store in the storage portion evaluation results of an image, added as additional information to the image which was subjected to evaluation, and the image evaluation portion may select at least one image having evaluation results which are equal to or greater than a predetermined threshold value from among the plurality of images stored in the storage portion, correspondingly stores in the storage portion the image and its evaluation results, and also deletes from the storage portion the other images and the evaluation results corresponding to the other images.

The image evaluation apparatus may comprise: an imaging condition correction portion which, in the case that there is an evaluation item requiring correction among the evaluation results of a plurality of images stored in the storage portion, carries out control so that the condition is corrected when imaging with the camera based on the evaluation item.

The image evaluation apparatus may comprise: a display portion which displays at least an image stored in the storage portion and correction information relating to the image, and a correction information extraction portion which analyzes evaluation results of an image stored in the storage portion and extracts correction information in order to increase the evaluation results of the image, and wherein the image evaluation portion display on the display portion an image stored in the storage portion and correction information of the image extracted by the correction information extraction portion.

The image evaluation portion may comprise a system which evaluates one image using a plurality of evaluation methods which differ from each other, and carry out respective evaluations equally with the plurality of evaluation methods with respect to images subjected to evaluation, among the plurality of continuous images, until predetermined conditions are satisfied, and carry out evaluations with weightings with respect to specified evaluation methods among the plurality of the evaluation methods, with respect to an image subjected to evaluation after the predetermined conditions have been satisfied, and the image evaluation portion may further judge that the predetermined evaluation conditions have been satisfied when an image is arbitrarily selected from among the plurality of images, or continuity is manifested in the evaluation results of the plurality of evaluation methods with respect to a plurality of the images.

BRIEF DESCRIPTION OF THE DRAWINGS

FIG. 14A is a conceptual drawing for the case that the histogram shown in FIG. 13A has been made two dimensional;

FIG. 14B is a conceptual drawing for the case that the histogram shown in FIG. 13B has been made two dimensional;

FIG. 16A is explanatory drawings showing examples of images which have been highly evaluated in an evaluation using the frequency distribution of the model image;

FIG. 16B is explanatory drawings showing examples of images which have been highly evaluated in an evaluation using the frequency distribution of the model image;

FIG. 22 is a conceptual drawing showing the imaged image and its evaluation results;

FIG. 23 is a conceptual drawing showing the imaged image and its evaluation results;

DETAILED DESCRIPTION OF THE INVENTION

Embodiments of the image evaluation apparatus and camera according to the present invention are described below with reference to the drawings. In the present embodiments, an explanation is given concerning a camera provided with the image evaluation apparatus according to the present invention. Embodiment 1 shows an example of the image evaluation apparatus according to the present invention applied to an interchangeable lens type camera.

In the explanation below, "threshold value" is a standard value used when carrying out various judgments. The threshold value is a value determined beforehand as a characteristic value of the camera. The threshold value may be a fixed value. Alternatively, it may be a variable changed automatically or by a user setting.

1. Embodiment 1

1.1 Constitution of the Camera

Figure 1:
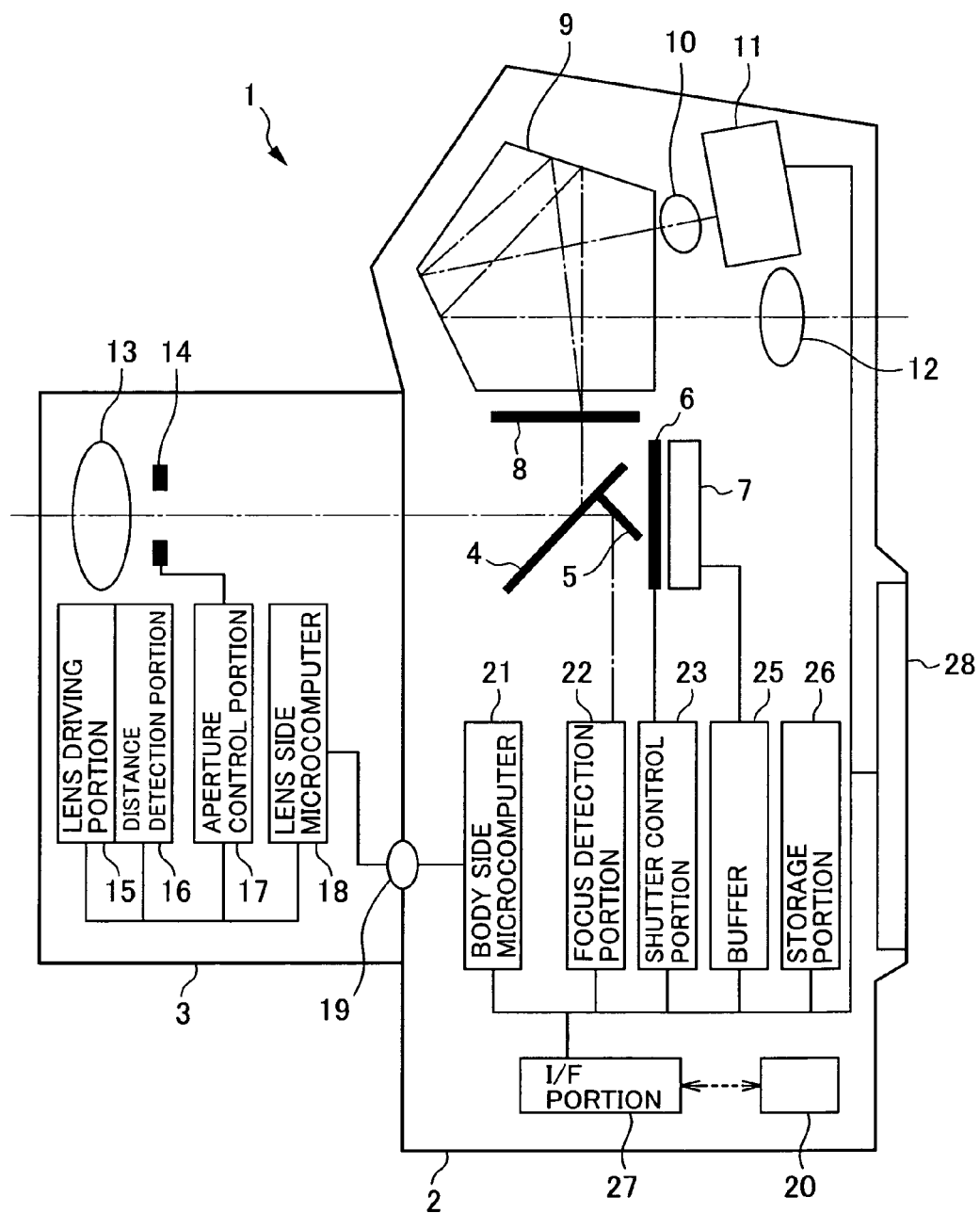
FIG. 1 is a block drawing showing the functional constitution of the camera according to embodiment 1.

FIG. 1 is a block diagram showing the functional constitution of the camera according to embodiment 1. The camera 1 of embodiment 1 is provided with a camera body 2 and a lens barrel 3. The camera 1 is constituted as an interchangeable lens type camera wherein a lens barrel 3 is mountable on and dismountable from the camera body 2.

The camera body 2 is provided with a main mirror 4, a sub-mirror 5, a shutter 6, an imaging sensor 7, a finder screen 8, a pentaprism 9, a photometric lens 10, a photometric sensor 11, and an eyepiece lens 12 as optical system components.

The subject light is admitted through the photographic lens 13 of the lens barrel 3. One part of the subject light (below referred to as the main mirror light) is reflected upwards at the main mirror 4. The main mirror light is imaged at the finder screen 8. The main mirror light imaged on the finder screen 8 is viewed by the user (photographer) via the pentaprism 9 and eyepiece lens 12.

The main mirror light imaged at the finder screen 8 is also guided to the photometric sensor 11 via the pentaprism 9 and the photometric lens 10.

The photometric sensor 11 is constituted of a color imaging sensor such as a CCD or a CMOS. The photometric sensor 11 divides the subject image into a plurality of regions and measures the light. The photometric sensor 11 commences its operation when the user half presses the release button, not illustrated. The photometric sensor 11 detects the image of the picture imaged on the finder screen 8 as image information. The image information detected by the photometric sensor 11 is transmitted to the body side microcomputer 21.

Moreover, in the present embodiment, the image of the picture detected by the photometric sensor 11 is referred to as the "image information". Further, the image data prepared by the later described image processing portion 24 is referred to as the "image". The image information detected by the photometric sensor 11 is originally obtained for photometric information color information used for exposure computation.

The main mirror 4 is provided with a half mirror in the vicinity of its center. The subject light transmitted by this half mirror (below referred to as half mirror light) is reflected at the sub-mirror 5 provided at the rear side of the main mirror 4. Then, the half mirror light is guided to the focus detection portion 22 disposed at the lower portion of the camera body 2. The main mirror 4 and the sub-mirror 5 are driven in the vertical direction by the mirror driving mechanism, not illustrated. The mirror driving mechanism is controlled by the body side microcomputer 21.

When the user fully presses the release button, the main mirror 4 is flipped upwards along with the sub-mirror 5 (mirror up) by the mirror driving mechanism. Next, when the shutter 6 opens, the subject light is imaged on the light receiving face of the imaging sensor 7. The imaging sensor 7 is constituted of a photodiode as well as a CCD or CMOS or the like. The imaging sensor 7 receives the subject image imaged by the photographic lens on its light receiving face, converts it to an electric signal (image signal), and outputs this to the image processing portion 24. After this, the main mirror 4 along with the sub-mirror 5 are returned down by the mirror driving mechanism (mirror down).

The imaging sensor 7 in the present embodiment functions as an imaging portion which continuously images a plurality of frame images of one frame of the subject in the later described photographic frame at predetermined time intervals.

The camera body 2 is further provided with a body side microcomputer 21, a focus detection portion 22, a shutter control portion 23, an image processing portion 24, a buffer 25, an I/F (interface) portion 27, a display panel 28 and an operating portion, not illustrated, as components of a control system.

The body side microcomputer 21 controls the operation of the camera 1 overall including the lens barrel 3. The body side microcomputer 21 is constituted of a microprocessor. The body side microcomputer 21 computes the lens driving amount based on the defocus information (amount) transmitted from the focus detection portion 22. Then, the body side microcomputer 21 transmits the lens driving amount to the later described lens side microcomputer 18.

Further, the body side microcomputer 21 computes a suitable exposure value based on the image signal from the imaging sensor 7, the aperture F value of the photographic lens 13 stored in the lens side microcomputer 18, lens information such as the focal length and the like, the set sensitivity information of the imaging sensor 7 and the like. Then, the body side microcomputer 21 transmits the aperture value determined based on the computed suitable exposure value to the lens side microcomputer 18. Further, the body side microcomputer 21 transmits the shutter speed determined based on the computed suitable exposure value to the shutter control portion 23.

In the camera 1 of the present embodiment, the detection of image information by the photometric sensor 11 and the detection of defocus information by the focus detection portion 22 are carried out at predetermined time intervals during the half press of the release button, specifically at a frame rate of 30 fps (30 frames per one second). This information is sequentially stored in the buffer 25.

The body side microcomputer 21 also carries out the flipping up of the main mirror 4 and the sub-mirror 5 when the release button, not illustrated, is fully pressed. The body side microcomputer 21 also drives the shutter control portion 23 and opens and closes the shutter 6.

The body side microcomputer 21 in the present embodiment, besides the above processing, also executes processes as the later described image evaluation portion, photographic condition correction portion, and correction information extraction portion.

The focus detection portion 22 detects the defocus information based on the admitted subject light. The defocus information can detect using, for example, the phase difference detection method. The focus detection portion 22 of the present embodiment detects the focus position of the subject relative to a plurality of ranging areas inside the picture, and transmits the defocus amount at this time to the body side microcomputer 21 as defocus information. Moreover, focus adjustment is usually carried out based on defocus information detected for one (or a plurality of) ranging area(s) among a plurality of ranging areas. However, defocus information detected for the other ranging areas is also output to the body side microcomputer 21.

The shutter control portion 23 controls the opening and closing of the shutter 6. The shutter control portion 23 is controlled by the body side microcomputer 21.

The image processing portion 24 carries out as necessary processing for noise elimination, A/D conversion, color interpolation processing, size conversion, encoding and the like, for the image signal output from the imaging sensor 7, and generates the image data (image) of each frame.

The buffer 25 is a temporary storage portion which stores the image generated by the image processing portion 24, and the histogram showing the frequency distribution of the motion vectors. The buffer 25 is provided with a photographed image storage area which stores the image, and a histogram storage area which stores the histogram showing the frequency distribution of the motion vectors. The buffer 25 of the present embodiment functions as a storage portion storing the image imaged by the imaging sensor 7 which is the imaging portion.

The storage portion 26 is a storage portion which holds its stored content even when the power of the camera 1 is switched off. The storage portion 26, besides the storage of a variety of setting information, also stores the later described model frequency distribution of the motion vectors in the model image and the like.

The I/F portion 27 is provided with a function of recording to the memory card 20 the image stored in the buffer 25, and the function of reading out the image recorded in the memory card 20, and is a write/read apparatus. A memory card 20 is removably mounted in the memory card slot, not illustrated, of the I/F portion 27.

The display panel 28 is constituted of a color liquid crystal panel. The display panel 28 is disposed at the back face of the camera body 2. The display panel 28, in addition to displaying an image during photography or an image stored in the buffer 25, displays a variety of information relating to the image. The display panel 28 in the present embodiment functions as a display portion displaying the image stored in the buffer 25, and the correction information related to this image.

The camera 1 is provided with an operating portion, not illustrated. This operating portion is an input acquisition portion which acquires operations by the user. The operating portion is constituted of the above mentioned release button, and a variety of dials, buttons, levers and the like.

Next, an explanation is given concerning the lens barrel 3. The lens barrel 3 is provided with a photographic lens 13, an aperture unit 14, a lens driving portion 15, a distance detection portion 16, an aperture control portion 17, and a lens side microcomputer 18.

The photographic lens 13 is an optical component which refracts the admitted subject light, and forms an image of the subject image at the light receiving face of the imaging sensor 7 at its exit side. The photographic lens 13 is driven along the optical axis direction by the lens driving portion 15. Focus adjustment is carried out by this driving. When the focus adjustment is carried out, distance information showing the distance between the camera 1 and the subject is detected by the distance detection portion 16.

The aperture unit 14 drives the aperture blades, not illustrated, according to the aperture value set by the lens side microcomputer 18. An area through which the subject light passes is formed by the driving of the aperture blades. The aperture unit 14 is driven by the aperture control portion 17.

The lens side microcomputer 18 controls the lens driving and the aperture value. The lens side microcomputer 18 is constituted of a microprocessor. The lens side microcomputer 18 acquires the distance information at the time the photographic lens 13 is driven, from the distance detection portion 16, and transmits it to the body side microcomputer 21. The lens side microcomputer 18 controls the lens driving portion 15 based on the lens driving amount transmitted from the body side microcomputer 21. Further, the lens side microcomputer 18 controls the aperture control portion 17 based on the aperture value transmitted from the body side microcomputer 21.

The exchange of signals between the body side microcomputer 21 and the lens side microcomputer 18 is carried out via the connection portion 19 disposed between the camera body 2 and the lens barrel 3. This connection portion 19 is provided at the respective mount portions of the lens barrel 3 and the camera body 2. The connection portion 19 is electric contacts which make contact and electrically transmit when the lens barrel 3 is mounted on the camera body 2.

1.2 Imaging Procedure and Operation

Figure 2:
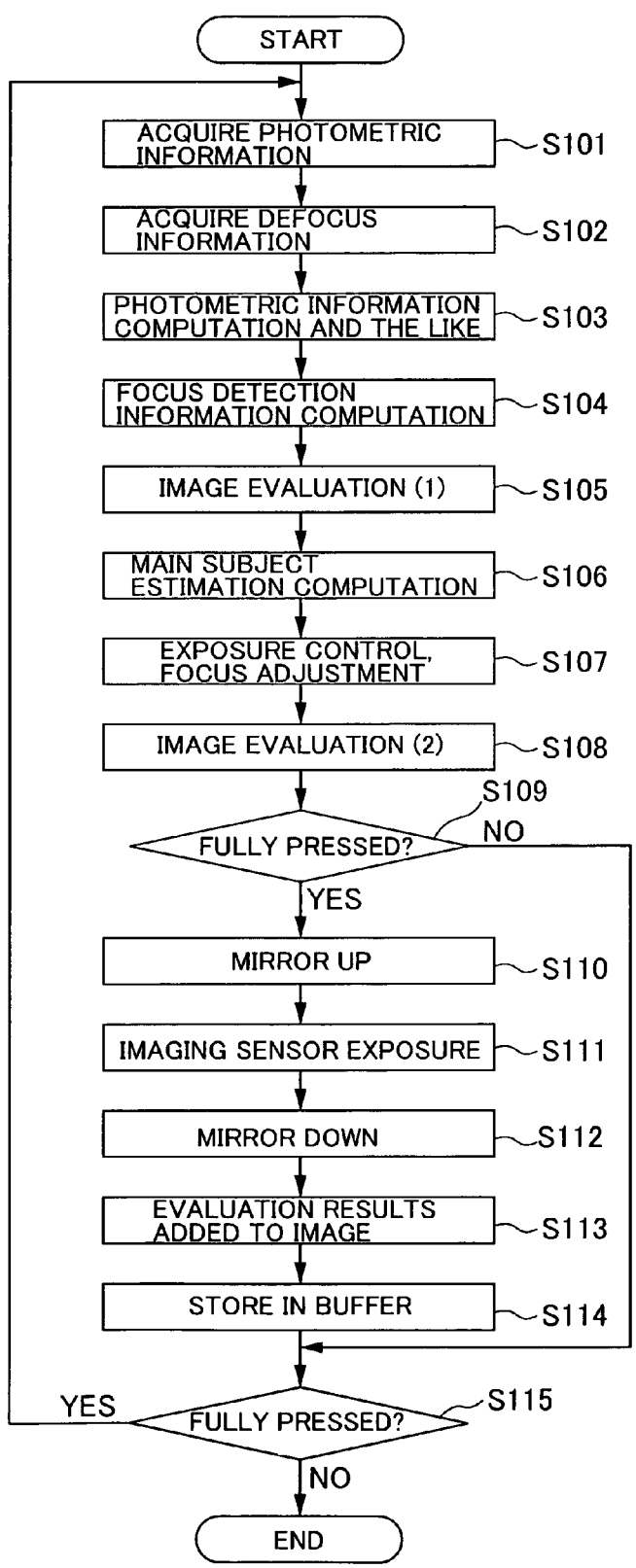
FIG. 2 is a flowchart showing the procedures from photographing to storing of the image in embodiment 1.

Next, an explanation is given referring to the flowchart of FIG. 2 for the series of procedures from the photographing to the storage of the image in the camera 1 of embodiment 1 constituted as described above. The processing of the flowchart shown in FIG. 2 is executed by the body side microcomputer 21. The processing based on this flowchart is started when the user selects the image evaluation mode item from the setting screen, not illustrated, and half presses the release button, not illustrated.

In step S101, the photometric sensor 11 acquires the image of the picture imaged on the finder screen 8 as image information. The photometric sensor 11 stores the acquired image information in the photographed image storage area of the buffer 25. The photometric sensor 11 acquires the image information at a frame rate of 30 fps, for example.

Moreover, in the case that the camera 1 is provided with a live view function, the image data (image) of the live view picture imaged by the imaging sensor 7 may be stored in the photographed image storage area of the buffer 25.

In step S102, the focus detection portion 22 acquires the defocus information corresponding to the plurality of ranging areas in the picture. Then, the focus detection portion 22 transmits the acquired defocus information to the body side microcomputer 21.

In step S103, the body side microcomputer 21 carries out the photometric computation (1), the motion vector computation (2), and the preprocessing computation for the main subject position estimation (3), as described below using the image information acquired in step S101.

In the photometric computation (1), the body side microcomputer 21 segments the image information of one picture portion into a plurality of blocks (segmented regions). Then, the body side microcomputer 21 calculates the luminance information (luminance value) of the subject from the output value of the segmented image information, as well as the photometric sensor gain and exposure time.

Figure 3A:
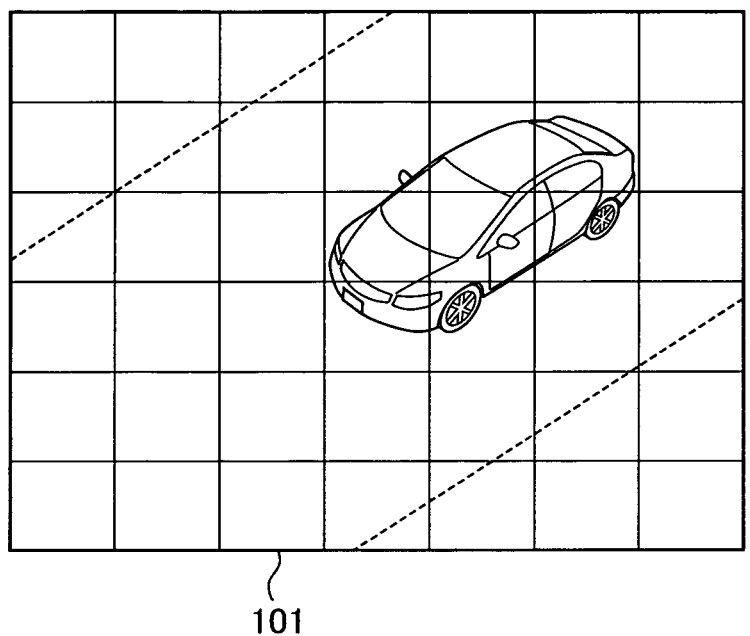
FIG. 3A is conceptual drawings for explaining the changes in the motion vectors.
Figure 3B:
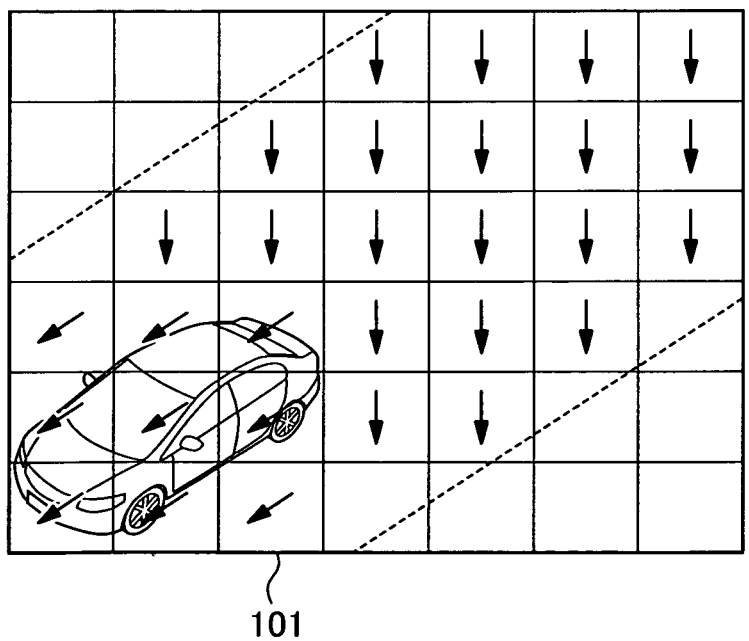
FIG. 3B is conceptual drawings for explaining the changes in the motion vectors.

In the motion vector computation (2), the body side microcomputer 21 detects the correlation value between the image information of the previous acquisition, and the image information of the current acquisition, for the image information acquired at a frame rate, for example of 30 fps. FIG. 3A and FIG. 3B are conceptual drawings for explaining the changes in the motion vectors. As shown in the figures, the picture (image frame) 101 is segmented into a plurality of blocks. In the computation of the motion vector, the body side microcomputer 21 examines by a method of pattern matching to which position in the currently acquired frame shown in FIG. 3B the image in the previously acquired frame shown in FIG. 3A has moved. In this way, the body side microcomputer 21 acquires the motion vector of the subject for each block.

In the pattern matching, the body side microcomputer 21, for each of the segmented blocks, inspects whether it fits a specified pattern, or to what degree there is resemblance. The more it fits with the specified pattern, or the more the resemblance, the higher the correlation value. The motion vector is detected as information for each block. Moreover, the motion vector may be sought by a method other than pattern matching, and may be sought by a combination of a plurality of methods including pattern matching.

In the preprocessing computation for the main subject position estimation (3), the body side microcomputer 21 detects the position of what is estimated to be a person's face within the image acquired as the image information. This face position detection uses a database storing a plurality of pattern images having common features of faces. The body side microcomputer 21 seeks portions resembling the pattern images stored in the database, in the target image, by a pattern matching method. When there is a portion which resembles a pattern image, this portion is estimated to be a face. The region of the portion estimated to be a face by pattern matching is used for the later described main subject position estimation computation as the face detection region information. Moreover, the region may be said to be in a range specified from one block or a plurality of blocks.

Moreover, also in this case, face detection may be sought by a method other than pattern matching, and it may be sought by a combination of a plurality of methods including pattern matching. In this case, a judging method may also be considered where the value obtained by each method is assigned a score, and the portion with the highest score is the main subject, or the like.

Further, as the preprocessing computation for the main subject position estimation (3), besides obtaining the above described face detection region information, it is possible to use a method obtaining distribution information of the colors from within the image information. This method is a method which, along with detecting a value of the output ratio R/G, B/G for each color, for each pixel or each segmented block of the image information, also detects this value at the periphery of the picture, and judges whether or not it is close to the value detected at the picture periphery in each block in the picture. According to this method, if there is a region within the picture whose colors differ greatly from the periphery of the picture, it is judged that there is a high probability that this is the main subject because this region is a subject which differs from the background. The information relating to this region can be used for the later described main subject position estimation computation.

In Step S104, the body side microcomputer 21 computes the defocus information transmitted from the focus detection portion 22 as focus detection information. Further, the body side microcomputer 21 selects the focus detection point based on the focus detection information computed from the defocus information acquired in a prescribed period. Namely, the body side microcomputer 21 selects the focus detection point showing the depth direction position which is closest to the depth direction position of the subject acquired the previous time, from among the focus detection information, computed from the defocus information acquired the current time.

By doing this, the body side microcomputer 21 captures and follows the photographed subject, and can obtain information concerning where the subject, in the frame acquired at the current time, is distributed in the planar direction in the picture. At this time, if the distance ring (focus ring) of the photographic lens 13 is driven during one cycle, the body side microcomputer 21 can correct the defocus information according to the amount of movement in its peripheral direction, and correct the depth direction position of the subject in a virtual space.

Further, the body side microcomputer 21, in the case of estimating that the subject is moving from the defocus information, corrects the amount moved by the subject during the period of the previous and current focus detection, and acquires the position in the depth direction of the subject.

In Step S105, the body side microcomputer 21 carries out processing as the image evaluation portion. In this processing, the body side microcomputer 21 evaluates the image information stored in the photographed image storage area of the buffer 25 based on a characteristic amount which changes in a chronological sequence in the photographic frame when images of a plurality of frames are imaged. Specifically, the body side microcomputer 21 calculates the frequency distribution of the motion vectors sought in step 103 concerning the image information stored in the buffer 25, and evaluates the characteristic amount of this frequency distribution.

Figure 4A:
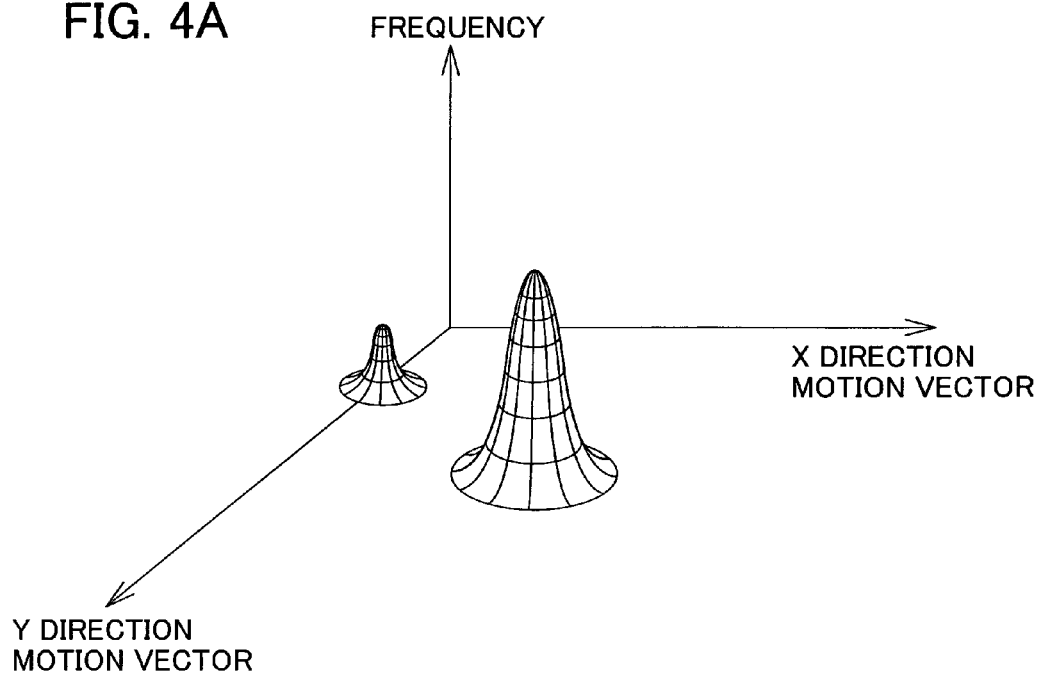
FIG. 4A is conceptual drawings showing histograms of the motion vectors.
Figure 4B:
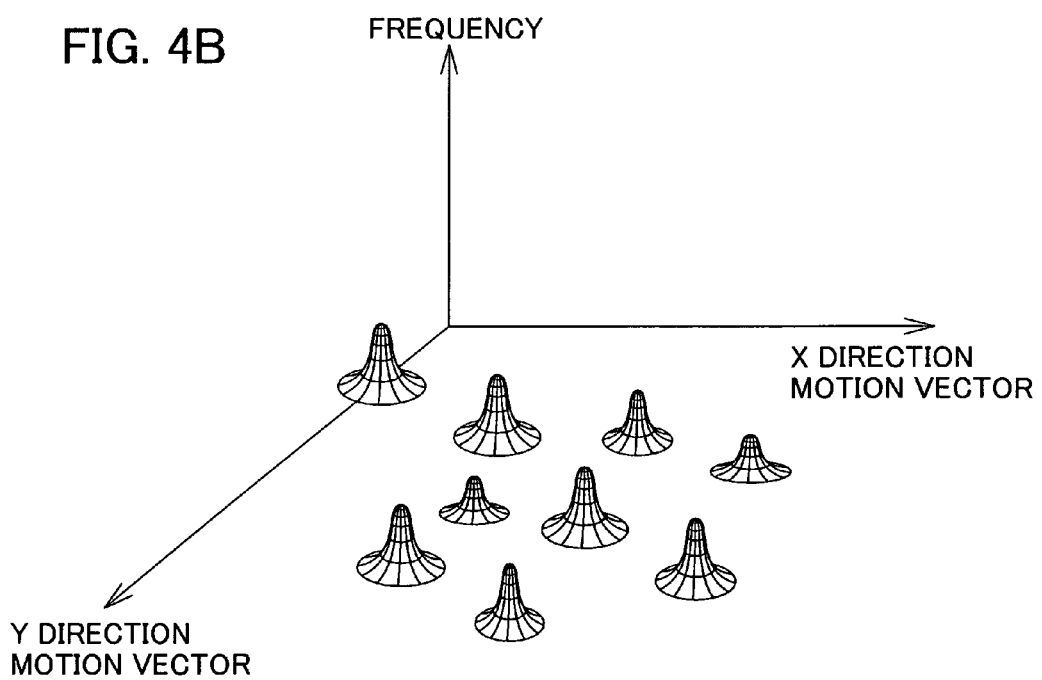
FIG. 4B is conceptual drawings showing histograms of the motion vectors.

Next, the frequency distribution of the motion vectors is specifically explained. FIG. 4 is a histogram showing the frequency distribution of the motion vectors of the imaged image. In FIGS. 4A and 4B, the two horizontal axes express the motion vector amounts (grades) showing the levels of the motion vectors in the X and Y directions in the picture, and the vertical axis represents the frequency. In the below explanation, the portions of the conical shapes where many frequencies of motion vectors are concentrated are referred to as "peak frequency included in the frequency distribution of the motion vectors" or "peak frequency".

FIG. 4A is a histogram showing the frequency distribution of the motion vectors in an automobile race. In an automobile race, if the subject is one automobile, it is estimated that the smaller the number of peak frequencies, the larger the automobile which is the subject of the picture will be shown. Accordingly, in this case, when an image has a smaller number of peak frequencies, it will be a more highly evaluated image, and a higher number of points will be added.

Further, even though also a sport, when the photographic scene is soccer, the evaluation is different. FIG. 4B is a histogram showing the frequency distribution of the motion vectors in soccer. In a sport played by a large number of players such as soccer, it is estimated that the higher the number of frequency peaks, the greater the number of players present in the picture, and the livelier the scene. Accordingly, the body side microcomputer 21 gives a high evaluation to an image with a high number of peaks, and a high number of points will be added.

In this way, the evaluation standard of an image differs depending on the photographed scene. Because of this, for example, the evaluation standard changes in response to the set photographic scene, and the evaluation can be carried out to match the user's intentions by changing the evaluation standard by a user setting. Moreover, the evaluation method is not limited to the above examples, and other evaluation methods may be applied. Other evaluation methods will be explained later.

The body side microcomputer 21 generates a histogram of the motion vectors such as shown in FIG. 4. Then, the body side microcomputer 21 adds a number of points which becomes the evaluation result to the image corresponding to the number of peak frequencies. The body side microcomputer 21 stores the generated histogram in the histogram storage area of the buffer 25 in association with the image information. The photographed image and its evaluation result are stored in the photographed image storage area of the buffer 25 as described later.

Further, when using a telephoto lens or a micro lens, it can be considered that the subject will often be photographed as a close-up. Because of this, the body side microcomputer 21 will give a high evaluation to an image with a small number of peak frequencies, and add a high number of points, when using a telephoto lens or a micro lens. Further, when a mid-telephoto to wide angle lens is used, it can be considered that the subject will often be photographed at wide range. Because of this, the body side microcomputer 21 will give a high evaluation to an image with a high number of peak frequencies, and add a high number of points, when using a mid-telephoto to wide angle lens. In this way, the evaluation standard may be automatically changed in response to the focal distance of the photographic lens which is mounted. In the case of changing the evaluation standard in response to the focal length of the photographic lens, it is not necessary for a user to make this setting every time. Because of this, the operability of the camera can be improved.

Moreover, in the case that a high number above a predetermined number of peaks is generated by the motion vectors distributed in the picture, the peak values which do not meet a threshold value may be excluded as objects of the evaluation. In this way, it is possible to increase the speed of the evaluation processing of an image.

Figure 5:
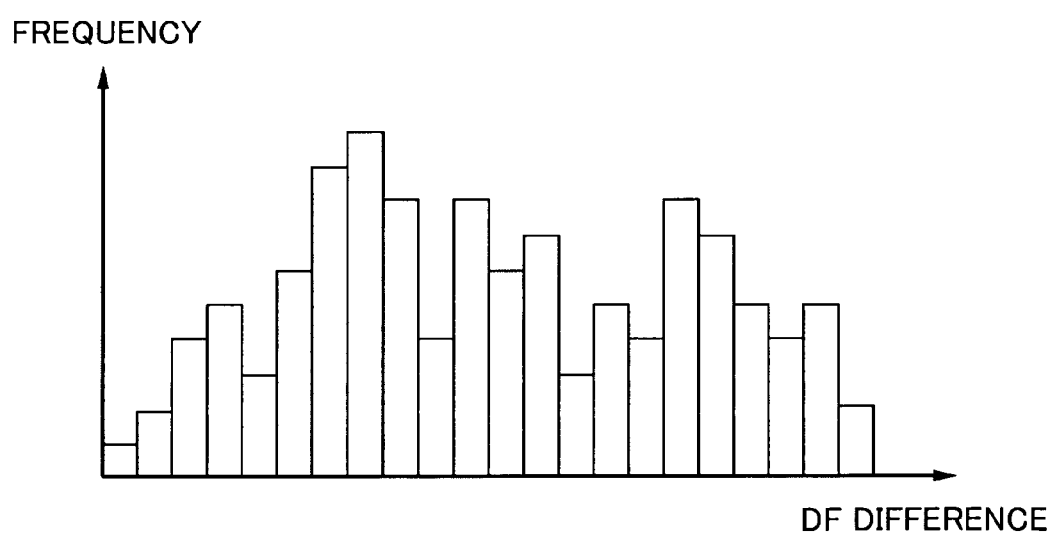
FIG. 5 is a conceptual drawing showing histograms of the defocus.

Further, the body side microcomputer 21, as a process of the image evaluation portion, may also evaluate the image information stored in the buffer 25 as the characteristic amount of the defocus information sought in Step S104. In this case, the body side microcomputer 21 generates a histogram of the defocus. FIG. 5 is a conceptual drawing showing the histogram of the defocus. In FIG. 5, the horizontal axis (X axis) represents the difference between frames of the defocus amount (Df difference), and the vertical axis (Y axis) represents the frequency. The body side microcomputer 21 seeks the difference in the defocus amount for each block between frames, and generates a histogram of these differences.

The body side microcomputer 21 generates a histogram of the defocus as mentioned above, and adds points to what will become the evaluation results of the image, corresponding to the number of peak frequencies. In the case that the defocus is taken as the characteristic value, an image where a change is taking place within the picture is taken as a good image, and a high number of points is added to an image having a high number of histogram peaks. Further, points may be given to an image having a peak at or above a threshold value.

Moreover, the defocus information of each image is stored along with the image information in the image file (for example, the EXIF format image file). This image file is stored in the memory card 20.

It is also possible to evaluate using a characteristic amount of a combination of the motion vector and the defocus information. For example, investigating the defocus amount at the respective peaks of the motion vectors, or investigating the motion vectors at the respective peaks of defocus amount. Alternatively, as a comprehensive evaluation, an average of the points of the respective weighted evaluation results may be taken as the evaluation result. In this way, a more detailed evaluation can be carried out.

The body side microcomputer 21, as a process of the image evaluation portion, after carrying out the evaluation for the target image, adds as additional information the evaluation result of the image to the evaluated image, and stores this in the photographed image storage area of the buffer 25.

In Step S106, the body side microcomputer 21, as a process of the image evaluation portion, carries out the main subject position estimation computation for the image for which the evaluation of Step S105 was carried out. In the present embodiment, detection of the face detection region information is carried out. Specifically, the body side microcomputer 21 segments the picture of the target image into a plurality of blocks and compares this image with the face detection region information obtained in Step S103 for the image in question. Then, the body side microcomputer 21 adds a predetermined number of points to the region where a face image is detected.

In the present embodiment, as the main subject position estimation computation, an explanation is given for an example using the face detection region information sought in Step S103. However, it is also possible to use other parameters for the main subject position estimation computation. For example, in the case of using the motion vector sought in Step S103, a predetermined number of points is added to a region with a high probability of having the main subject (for example, a ranging area indicated by the user and the region of its vicinity; or a region in the vicinity of the center of the frame in the case of no indication by the user; or the like). Further, in the case of using the color distribution information explained in Step S103, in the same way, a predetermined number of points is added to a region having a high probability of having the main subject. Further, in the case of using the focus detection information sought in Step S104, a predetermined number of points is added to a region where a subject is distributed close to the position in the depth direction of the captured subject.

Further, in the main subject position estimation computation, all of the above computation items may be combined together. In this case, the contribution for each item may be adjusted by appropriately setting the size of the number of points to be added for each item.

In Step S107, the body side microcomputer 21, based on the position of the main subject sought in Step S106, and the luminance information calculated in Step S103, carries out the exposure computation taking into account the luminance of the main subject. The body side microcomputer 21 determines the aperture value and the shutter speed based on the suitable exposure value sought by the exposure computation. Then, the body side microcomputer 21 transmits the aperture value to the lens side microcomputer 18, and transmits the shutter speed to the shutter control portion 23. The lens side microcomputer 18 carries out the aperture adjustment controlling the aperture control portion 17 based on the aperture value transmitted from the body side microcomputer 21. The shutter control portion 23 controls the shutter 6 based on the shutter speed transmitted from the body side microcomputer 21. In this way, the shutter 6 is opened and closed.

The body side microcomputer 21, along with selecting defocus information corresponding to the main subject from the defocus information sought in Step S104, based on this also computes the driving amount of the photographic lens 13 and transmits the same to the lens side microcomputer 18. The lens side microcomputer 18 controls the lens driving portion 15 based on the lens driving amount transmitted from the body side microcomputer 21 and carries out the focus adjustment of the photographic lens 13 by driving the distance ring.

In Step S108, the body side microcomputer 21, as a process of the image evaluation portion, evaluates the image information stored in the buffer 25 based on the characteristic amount of the motion vector and the defocus amount and the like, and the position of the main subject sought in Step S106.

In this Step S108, the comprehensive evaluation of the photographed image is carried out by totaling the points given when evaluating the motion vector and the defocus amount as the characteristic amounts, and the points given when evaluating based on the later described position of the main subject.

As the evaluation based on the position of the main subject, for example, there are the items of the evaluation of the focus/blurring as below, the evaluation of the white balance, evaluation of the exposure and the like. The body side microcomputer 21 adds points to execute the evaluation for at least one among these items. The body side microcomputer 21, in the case that evaluation has been carried out for a plurality of items, seeks a total or average of the points for each item.

The body side microcomputer 21, in the focus/blurring evaluation, applies a differential filter to the photographed image and detects the edges. Then, the body side microcomputer 21 detects from a half value width whether the edges are wide or narrow, and portions narrower than a predetermined value are judged to be in focus. In this way, the body side microcomputer 21 judges whether or not a portion which is in focus is at the position of the main subject sought in Step S106. The body side microcomputer 21 judges that the focus is good if a portion which is in focus is included at the position of the main subject sought in Step S106, and adds a predetermined number of points.

Further, the body side microcomputer 21 can specify a region where the subject is distributed more towards the side of infinite distance than the position of the main subject, and a region where the subject is distributed at the near side, from the defocus information obtained in Step S102. The body side microcomputer 21 judges that an image has back focus if the portion which is in focus is distributed more towards the infinite distance side than the position of the main subject. Further, the body side microcomputer 21 judges that the image has front focus if the portion which is in focus is more towards the near side than the position of the main subject.

On the other hand, if there is no portion anywhere which is in focus, and the edge thickness is similar throughout the picture, there is a high probability that the image is blurred by vibrations. In this case, the body side microcomputer 21 judges that vibrations are arising.

In this way, points are not added for the case that the focus is back focused or front focused, or the case of vibrations.

In the case of white balance evaluation, the body side microcomputer 21 first calculates the color coordinates at the position of the main subject estimated to be a face. Then, the body side microcomputer 21 judges whether the calculated color coordinates are within the scope of color coordinates which are expected (thought to be preferable) for a human face. The body side microcomputer 21 judges that the white balance is not a problem with respect to persons if the color coordinates of the main subject are within the scope of the expected color coordinates, and adds a predetermined number of points.

The exposure evaluation is carried out for the items below. The body side microcomputer 21 judges whether there is underexposure (blackout) or overexposure (whiteout) at the position of the main subject estimated to be a face. Further, the body side microcomputer 21 seeks regions where there is underexposure (blackout) or overexposure (whiteout) with respect to the overall picture, and judges whether their proportion is below a predetermined value. Further, the body side microcomputer 21 judges whether it is within a preferable density scope of a face at the main subject position. The body side microcomputer 21 considers that there is no problem with the exposure if there judgments are all positive, and adds a predetermined number of points.

Moreover, in the case that a plurality of items are the evaluation targets, the contribution ratio of each item can be adjusted by appropriately setting the number of points added for each item. Further, the contribution ratios may be such that they can be individually set by a setting screen, not illustrated, according to the importance given by the user. In this case, the body side microcomputer 21 adjusts the issuance ratio for each item by differentiating the numbers of points for each item according to the conditions set through the setting screen.

The body side microcomputer 21 carries out the comprehensive evaluation of the photographed image by calculating a total value or average value of the points from the evaluations based on the position of the main subject described above, and the points from the evaluation of the motion vector or the defocus amount or the like as the characteristic amount in the previous Step S105.

In Step S109, the body side microcomputer 21 judges whether or not the release button, not illustrated, is fully pressed. In the judgment of Step S109, if it is not being fully pressed, the flow proceeds to Step S115. Further, if it is being fully pressed, the flow proceeds to Step S110. In Step S110, the body side microcomputer 21 puts the main mirror 4 along with the sub-mirror 5 in a mirror up state.

In Step S111, the body side microcomputer 21 drives the shutter control portion 23 and opens and closes the shutter 6, and images (exposes) an image on the imaging sensor 7. The image imaged on the imaging sensor 7 is output to the image processing portion 24 as an image signal.

In Step S112, the body side microcomputer 21 controls the mirror driving mechanism, not illustrated, and puts the main mirror 4 along with the sub-mirror 5 in a mirror down state. In this way, the main mirror 4 and the sub-mirror 5 are returned to the position shown in FIG. 1.

In Step S113, the body side microcomputer 21 takes the evaluation results obtained in Step S108 immediately before the release button was fully pressed as the evaluation results of the image photographed just after the release button was fully pressed. In Step S114, the body side microcomputer 21 stores the photographed image and its evaluation results in the photographed image storage area of the buffer 25.

The buffer 25 stores in respective predetermined areas the image information acquired by the photometric sensor 11 during the half press of the release button, the evaluation results of the image by this image information, and the information concerning the histogram. The body side microcomputer 21 stores the image photographed when the release button was fully pressed (or during the full press) and its evaluation results in the photographed image storage area of the buffer 25. After this, the body side microcomputer 21 erases each type of information such as the image information acquired by the photometric sensor 11 and the like from the predetermined areas of the buffer 25.

In Step S115, the body side microcomputer 21 judges whether the release button is being fully pressed. If the release button is not being fully pressed in the judgment of Step S115, the processing of the present flowchart is finished. On the other hand, if it is being fully pressed in the judgment of Step S115, the flow returns to Step S101.

The camera 1 repeatedly carries out the processes of Steps S101 to S114 while the release button is being fully pressed. While the release button is being fully pressed, images are continuously imaged at a predetermined imaging timing (for example, 2 to 9 frames/second). The body side microcomputer 21 does not record to the buffer 25 all of the images imaged while the release button is fully pressed, and stores in the buffer 25 only the images it has selected.

Namely, the body side microcomputer 21, as processing of the image evaluation portion, selects at least one image whose image evaluation points are equal to or greater than a predetermined threshold value, from among the plurality of images stored in the photographed image storage area of the buffer 25 (images imaged by the imaging sensor 7). Then, this image and its evaluation results remain in the photographed image storage area of the buffer 25. Furthermore, the other images and their evaluation results are deleted form the buffer 25. By carrying out such processing, the storage area of the buffer 25 can be effectively used.

All of the imaged images may also be stored in the buffer 25. Further, the evaluation may be carried out by extracting, for example, every fifth image, and not evaluating all of the images.

The above described selection and storing of images is executed in the continuation of Step S116 of FIG. 2. However, in Step S114, when storing in the photographed image storage area of the buffer 25 the photographed image and its evaluation results, it may be selected whether or not to store based on the evaluation result points.

1.3 Other Evaluation Methods

In the above embodiment, an explanation was given for an example where the frequency distribution of the motion vectors is calculated, and the image is evaluated with this frequency distribution as a characteristic amount. However, the evaluation method of the present invention is not limited to this example, and an evaluation method such as those shown in the below embodiments may also be applied.

1.3.1 Evaluation According to Change in Defocus Amount

Figure 6:
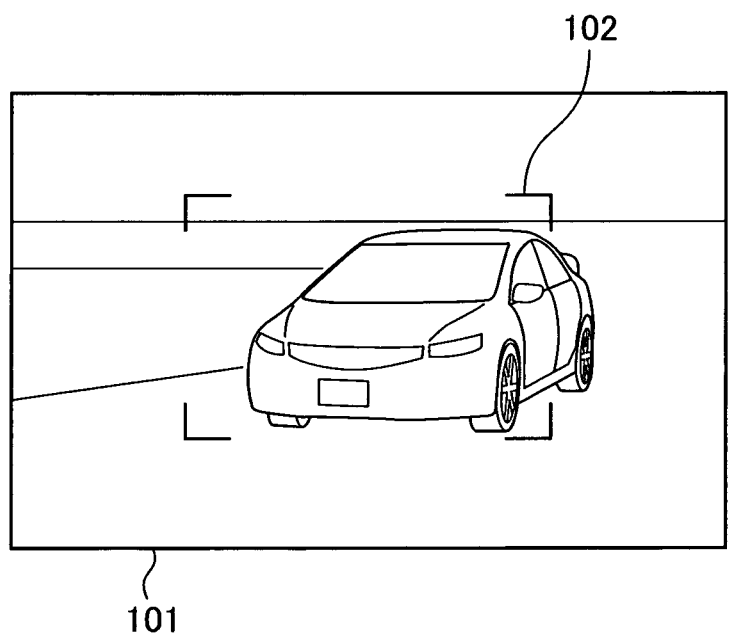
FIG. 6 is a conceptual drawing for explaining a change in the defocus amount.
Figure 7:
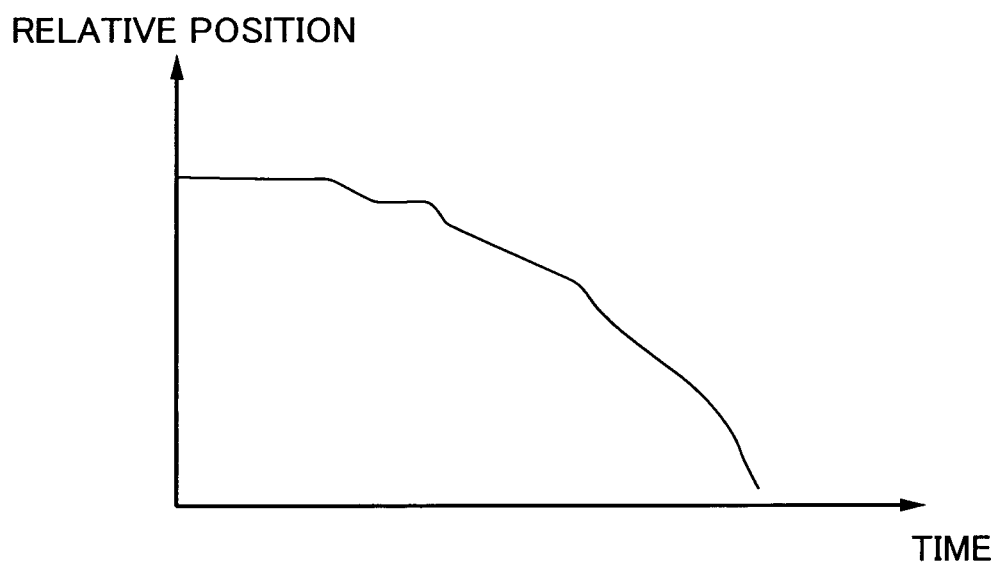
FIG. 7 is a graph showing the time variation of the relative position of the subject in the optical axis direction.

FIG. 6 is a conceptual drawing for explaining a change in the defocus amount. FIG. 7 is a graph showing a change in time of the relative position of the subject in the optical axis direction. In the case of photographing a moving subject such as an automobile race, the change in time of the defocus information detected by the ranging area in the picture is observed. As shown in FIG. 6, the vicinity of the center of the picture (photographic frame) 101 displays a focus zone 102. Pluralities of ranging areas, not illustrated, are disposed within this focus zone 102.

As explained before, usual focus adjustment is carried out based on defocus information detected in one (or a plurality of) ranging areas among a plurality of ranging areas. However, the defocus information detected for the other ranging areas is also output to the body side microcomputer 21. In the present embodiment, the defocus amount of a main subject moving in the optical axis direction is detected in all of the ranging areas included in the ranging area relating to the focus adjustment. The body side microcomputer 21 divides the difference in the defocus amount between frames by the frame rate (1/30 sec) and calculates a speed change rate (relative movement state) of the main subject between the frames. When the main subject is moving at high speed towards the camera 1, as shown in FIG. 7, the change in time of the relative position of the main subject becomes large. Accordingly, the speed change rate of the main subject also becomes large along with the elapse of time.

The body side microcomputer 21 calculates a speed change rate for each image continuously photographed, and carries out evaluation of the speed change amount as the characteristic amount. In an automobile race, an image photographed when an automobile which is the main subject is approaching at high speed is assumed to be a good image having movement. Accordingly, the body side microcomputer 21 increases the evaluation of the image having the highest speed change ratio of the main subject, and adds a large number of points.

Further, requirements according to the composition may be added to the speed change ratio. Namely, the evaluation may be carried out adding the requirements that the size of the main subject be equal to or greater than a threshold value in the whole of the picture 101, and that the main subject be in the vicinity of the center of the picture 101. The position and size of the main subject can be specified by the method of the main subject position estimation explained in item 1.2. Further, the position and size of the main subject can be specified based on the position of the ranging area where defocus information is detected within the focus zone 102. In the case that the evaluation is carried out with requirements according to the composition added to the speed change ratio, it is possible to increase the evaluation of an image where the main subject is approaching at high speed, and further, the main subject is photographed in the vicinity of the center of the screen, and large.

1.3.2 Evaluation by Change in Number of Peaks

Figure 8A:
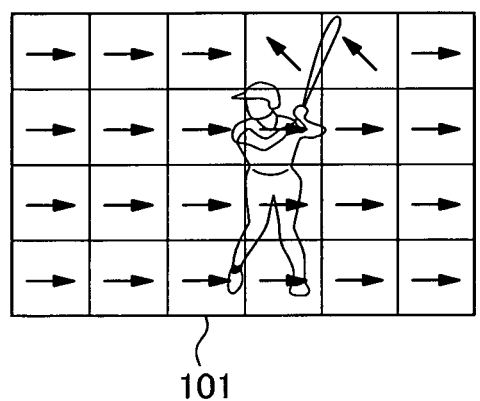
FIG. 8A is conceptual drawings for explaining changes in the motion vectors of the subject.
Figure 8B:
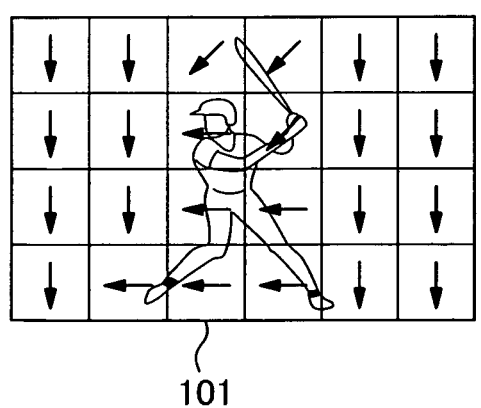
FIG. 8B is conceptual drawings for explaining changes in the motion vectors of the subject.
Figure 9:
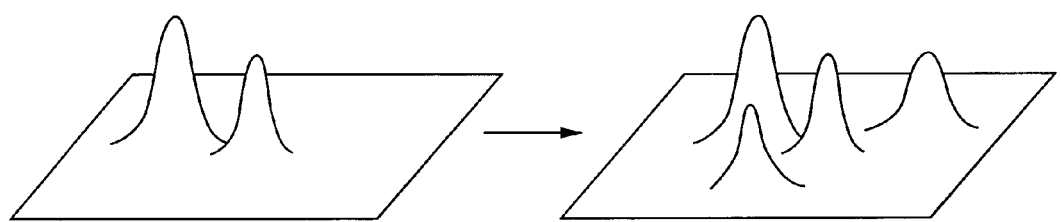
FIG. 9 is a conceptual drawing for explaining changes in the histogram of the motion vectors.
Figure 10:
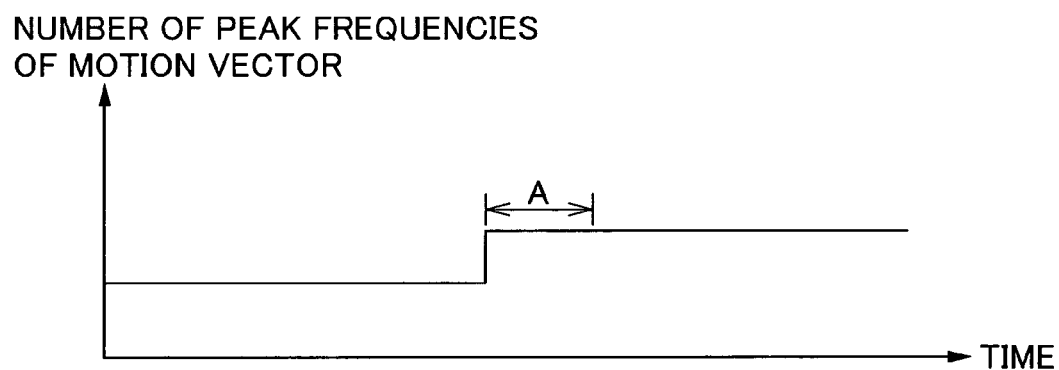
FIG. 10 is a graph for explaining changes in the number of peak frequencies included in the frequency distribution of the motion vector.

FIG. 8A and FIG. 8B are conceptual drawings for explaining a change in the motion vectors of the main subject. FIG. 9 is a conceptual drawing for explaining a change in the histogram of the motion vectors. FIG. 10 is a graph for explaining a change in the number of peak frequencies included in the frequency distribution of the motion vectors.

In this evaluation method, the number of peak frequencies included in the frequency distribution of the motion vectors arising within the picture is observed, and the evaluation of an image imaged within a predefined time from a change in the number of peak frequencies is given a relatively higher evaluation than other images. The number of peak frequencies can be considered to be a number of subjects which are making different movements within the picture. In the case that the number of peak frequencies has changed at a given point in time, it is estimated that some kind of change has occurred in the subject. For the occurrence of a change in the subject, it can be considered that there is a high probability of good scenes having movement shortly thereafter. Accordingly, the body side microcomputer 21 gives a high evaluation to images imaged within a predefined time from a change in the number of peak frequencies. Moreover, small peaks generated by noise and the like are cut with a filter.

The body side microcomputer 21, as shown in FIG. 8, computes a frequency distribution of the motion vectors arising between the frames of each block, for a picture 101 which has been segmented into a plurality of blocks. Then, the body side microcomputer 21 extracts peak frequencies which have a frequency equal to or greater than a threshold frequency from among the peak frequencies included in this frequency distribution. Furthermore, the body side microcomputer 21, along with calculating the number of extracted peak frequencies, observes changes in chronological sequence in the number of the peak frequencies of each image.

For example, from a state wherein the batter is in a batting posture as shown in FIG. 8A, the swing of the bat starts, as shown in FIG. 8B. Thereupon, as shown in FIG. 9, in consecutive images, in a histogram showing the frequency distribution of the motion vectors, the number of peak frequencies changes abruptly. Accordingly, there is a high probability of good scenes having movement shortly after the manifestation of such a change. Because of this, the body side microcomputer 21, as shown in FIG. 10, gives a higher evaluation than other images to images imaged within a predetermined time (period A in the figure), and adds a number of points.

Further, the evaluation method of the present embodiment may be used to extract an image which is the target of evaluation. Namely, the body side microcomputer 21 extracts a plurality of images imaged within a predefined time from the manifestation of the above described change. Then, the body side microcomputer 21 adds a number of points to the image with the highest number of peak frequencies in the histogram of the motion vectors, or the image including the largest peak frequency, from among the extracted images. Besides the present example, it is also possible combine the evaluation method of the present embodiment with other evaluation methods.

1.3.3 Evaluation Using Model Image Histogram (1)

Figure 11:
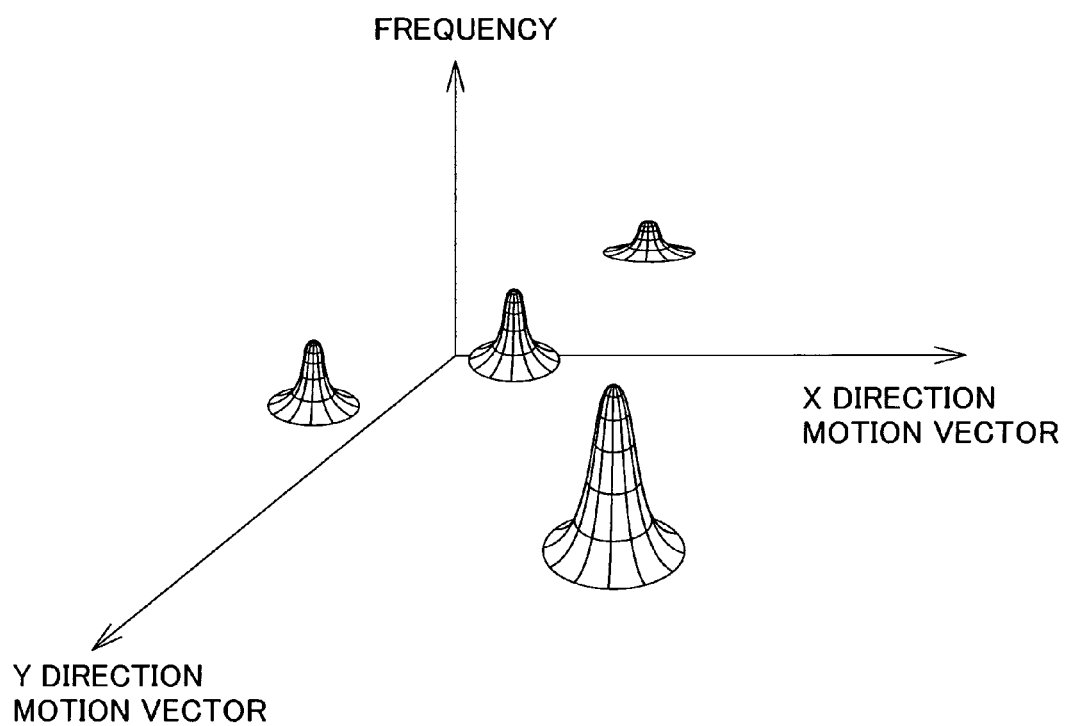
FIG. 11 is a conceptual drawing for explaining the histogram of the motion vectors of the imaged image.
Figure 12A:
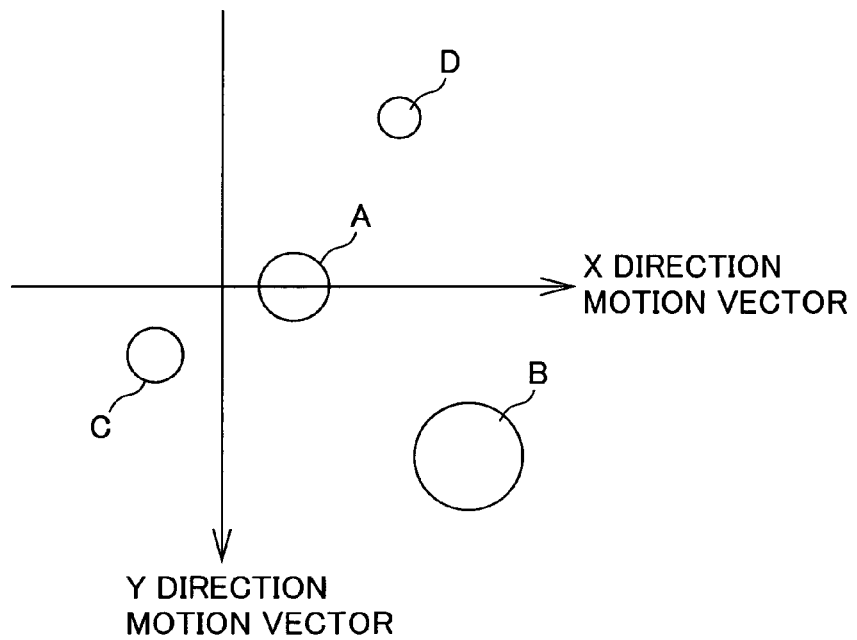
FIG. 12A is conceptual drawings for the case where the histogram of FIG. 10 has been made two dimensional.
Figure 12B:
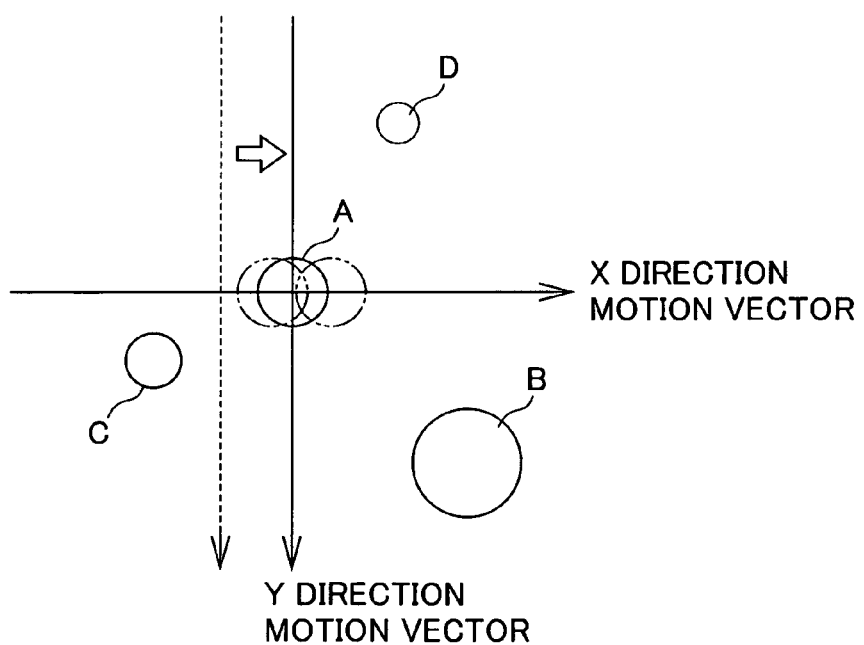
FIG. 12B is conceptual drawings for the case where the histogram of FIG. 10 has been made two dimensional.

FIG. 11 is a conceptual drawing for explaining the histogram of the motion vectors in an imaged image. FIG. 12A and FIG. 12B are conceptual drawings for the case that the histogram of FIG. 10 is converted to two dimensions. Further, the histogram of the motion vectors, as shown in FIG. 4 and FIG. 9, is shown as a three dimensional figure. However, if necessary, the histogram of the motion vectors may be shown as a two dimensional figure as shown in FIG. 12. This is in order to facilitate the explanation of the histogram.

In the evaluation method of the present embodiment, the evaluation is carried out based on the similarity between the frequency distribution of the motion vectors of the imaged image, and a model frequency distribution of motion vectors set beforehand as an evaluation standard of a preferable image (below referred to as a model image).

First, the body side microcomputer 21 computes a frequency distribution of the motion vectors arising between the frames of each block for the picture segmented into a plurality of blocks, and generates a histogram showing the frequency distribution of the motion vectors. Here, a histogram showing the frequency distribution of the motion vectors as shown in FIG. 11 is generated. The histogram showing the frequency distribution of these motion vectors may in some cases include components of camera movement such as hand shake and the like. Accordingly, the body side microcomputer 21, as shown in FIG. 12, carries out processing to shift the point of origin of the histogram.

FIG. 12A is a histogram showing the frequency distribution of the motion vectors before the point of origin is shifted. In the picture, assuming that the main subject is in the vicinity of the center, it can be considered that the peak frequency A which is equal to or above a threshold frequency and manifested on the coordinate axis of the X direction is a motion component of the camera 1. In the present example, it can be considered that there is a hand shake component in the X direction. Thus, as shown in FIG. 12B, the origin of the histogram is shifted to the center of the peak frequency A present on the coordinate axis of the X direction. In FIG. 12B, the dotted line shows the coordinate axis in the Y direction before the shift.

Because the motion components of the camera 1 change between frames, the position of the peak frequency A also changes between frames, as shown by the chain double dashed line in FIG. 12B. The peak frequencies B to D which express characteristics of the subject also fluctuate between frames because motion components of the camera are superposed thereon, but if the point of origin of the coordinates of the histogram is shifted such that the peak frequency A becomes the origin, then the motion components of the camera are deleted, and the motion of the subject emerges and can be manifested on the histogram. Accordingly, the body side microcomputer 21, as shown in FIG. 12B, specifies the frequency distribution of the motion vectors including peak frequencies B to D as the frequency distribution of the motion vectors of the imaged image. In this way, it is possible to delete the motion components of the camera 1, namely, the motion components of the photographing area, by carrying out processing to shift the origin for the histogram of the motion vectors. By deleting the motion component of the photographing area, it is possible to carry out more accurate evaluation.

Further, while not shown in FIG. 11, it can also be considered that there are motion components of the camera 1, namely, hand shake components in the Y direction, in the peak frequencies manifested on the coordinate axis of the Y direction. In the case that peak frequencies equal to or greater than a threshold frequency are not manifested on the coordinate axis of the X direction, when peak frequencies equal to or greater than a threshold frequency are manifested on the coordinate axis of the Y direction, it is possible to delete the motion components of the photographing area by carrying out processing to shift the point of origin as above.

The body side microcomputer 21 compares the frequency distribution of the motion vectors in the imaged image, and the model frequency distribution of the motion vectors in the model image, and evaluates the image based on their similarity. The body side microcomputer 21 judges the similarity for each of the sequentially imaged images. The body side microcomputer 21 increases the evaluation of images having a frequency distribution with a high similarity to the model frequency distribution of the motion vectors of the model image, and adds a large number of points. Further, pluralities of model frequency distributions of the motion vectors in model images are stored beforehand in the storage portion 26. The body side microcomputer 21 reads out all of or a portion of the model frequency distributions of the motion vectors in the model images stored in the storage portion 26, selects a model frequency distribution of the motion vectors in the model image which approximates the frequency distribution of the motion vectors in the imaged image, and carries out the evaluation of the image. Further, evaluation of an image may also be carried out by reading out and using a model frequency distribution of the motion vectors in a model image corresponding to the photographed scene.

Moreover, the model image is a best shot image of mainly various moving bodies for which movement can be expected. The frequency distribution of the motion vectors in these best shot images is the model frequency distribution of the motion vectors in the model images. A plurality of model frequency distributions of the motion vectors in the model images are prepared to correspond to photographic scenes. However, the model frequency distribution of the motion vectors in the model images do not correspond to all photographic scenes. For usual photography, it is necessary only to prepare for the photographic scenes which are expected to be most photographed.

For example, in baseball, the moment when a batter hits, the moment when a player throws the ball or the like. In soccer, the moment when a player shoots the ball, the moment of heading, or the like. Alternatively, in a ski jump event, the time while a jumper is airborne, or in speed skating, the time while a skater is traveling in a straight line. Furthermore, in motor sports, the time while an automobile or motorcycle is traveling a corner.

Further, the model frequency distribution of the motion vectors in a model image do not all have to be stored in the storage portion 26. The model frequency distribution of the motion vectors in a model image can be taken into the camera 1 as necessary. For example, they can be taken into the camera 1 by a communication medium such as the internet or a wireless LAN, or alternatively via a recording medium such as a memory card. It is also possible to appropriately set by an operation of the user which model frequency distributions are taken in.

1.3.4 Specific Example of Method of Judging Similarity

Next, an explanation will be given of the method of judging the similarity between a frequency distribution of the motion vectors in an imaged image, and the model frequency distribution of the motion vectors in a model image.

Figures 13A, 13B:
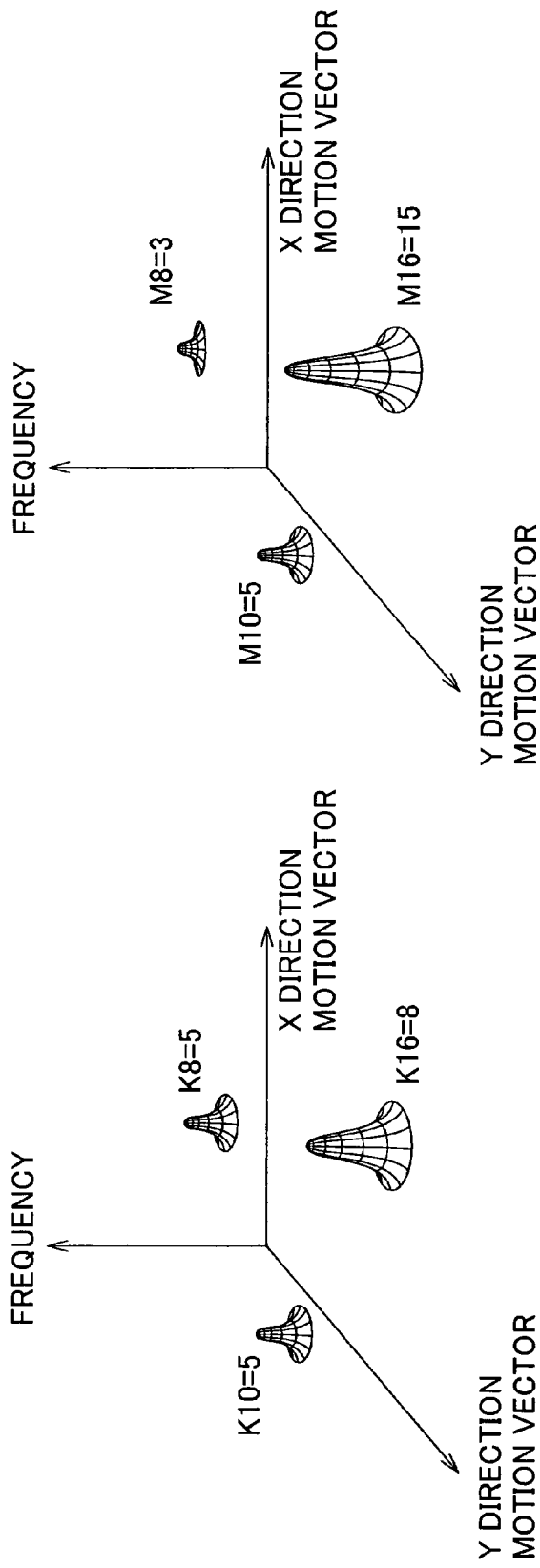
FIG. 13A is a histogram showing the model frequency distribution of the motion vectors in the model image.
FIG. 13B is a histogram showing the frequency distribution of the motion vectors in the imaged image.

FIG. 13A is a histogram showing a model frequency distribution of the motion vectors in a model image, and FIG. 13B is a histogram showing the frequency distribution of the motion vectors in an imaged image. FIG. 14A is a conceptual drawing showing the case of converting the histogram shown in FIG. 13A into a two dimensional graph. FIG. 14B is a conceptual drawing showing the case of converting the histogram shown in FIG. 13B into a two dimensional graph.

The body side microcomputer 21 segments into a plurality of blocks the developed region of the two dimensional graph. The body side microcomputer 21, as shown in FIG. 14A, segments into a plurality of blocks K1 to K16 the developed region for the histogram showing the model frequency distribution of the motion vectors in the model image. In the histogram showing the model frequency distribution of the motion vectors in the model image, peak frequencies are manifested at the positions of blocks K8, K10 and K16.

The body side microcomputer 21, as shown in FIG. 14B, segments into blocks M1 to M16 the developed region of the histogram showing the frequency distribution of the motion vectors in the imaged image. In the histogram showing the frequency distribution of the imaged image, peak frequencies are manifested at the positions of blocks M8, M10 and M16. The body side microcomputer 21 judges the similarity for the peak frequencies of the three peaks included in the respective frequency distributions. Further, in FIG. 14A and FIG. 14B, the size and position on the coordinate axis of each block is the same. Accordingly, blocks K8, K10 and K16 respectively correspond to blocks M8, M10 and M16. Further, the numerical values assigned to each block number show the frequency amount in the peak frequency of each block.

The body side microcomputer 21 calculates the absolute value of the frequency difference for each corresponding block. The frequency amount of each peak frequency is shown in FIG. 13. For example, the frequency amount of the peak frequency present at the block K16 in FIG. 13A is "8". On the other hand, the frequency amount of the peak frequency present at the block M16 (corresponding to block K16) in FIG. 13B is "15". In this case, the frequency difference is "7". Further, in the case that there are no respective peak frequencies at the corresponding block, the frequency difference becomes the frequency amount of the peak present at the other block, as is. For example, if there is no peak frequency present at block M16 of FIG. 13B, the frequency difference between block K16 and M16 becomes "8".

The body side microcomputer 21 calculates the frequency differences for each block manifesting a peak frequency. Then, it seeks the sum total Σ of the absolute values of the frequency differences. The sum total Σ is sought according to absolute value of (Kn−Mn). "Kn" is the total of the frequency amounts of the peak frequencies present at the blocks K8, K10, and K16. "Mn" is the total of the frequency amounts of the peak frequencies present at the blocks M8, M10 and M16. In the example of FIG. 13, the sum total Σ is absolute value of (18−23)=5. This sum total Σ is an indicator when judging the similarity.

When comparing the histograms of FIG. 13A and FIG. 13B FIG. 13A and FIG. 13B, if the frequency amounts of the peak frequencies are the same, the frequency difference is zero. On the other hand, in the case that the frequency amounts of the peak frequencies differ, a positive or negative value is computed for the frequency difference. The more the frequency amounts of the peak frequencies differ, the greater the frequency difference. Accordingly, the lower the sum total Σ, the higher the similarity, and the higher the sum total Σ, the lower the similarity.

The body side microcomputer 21 judges the similarity by comparing the sum total Σ and a standard value set beforehand. The standard values are set stepwise. As an example, if sum total Σ<20, the evaluation is "high"; if 20≤sum total Σ≤50, the evaluation is "medium"; and if 50<sum total Σ, the evaluation is "low". The standard values may also be more finely set. Further, they may also be changed automatically or by a user setting.

In the judgment of similarity described above, in the case that a plurality of images have a high evaluation, a further process to select one image among them may be added. Below, explanations are given for two specific examples.

1.3.5 Specific Example of Image Selection (1)

Figure 15A:
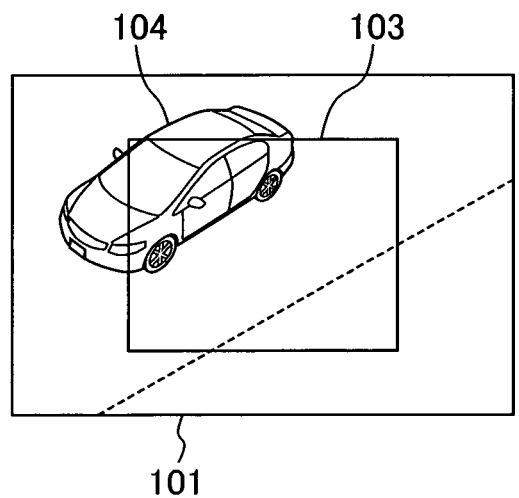
FIG. 15A is explanatory drawings showing examples of images which have been highly evaluated in an evaluation using the frequency distribution of the model image.
Figure 15B:
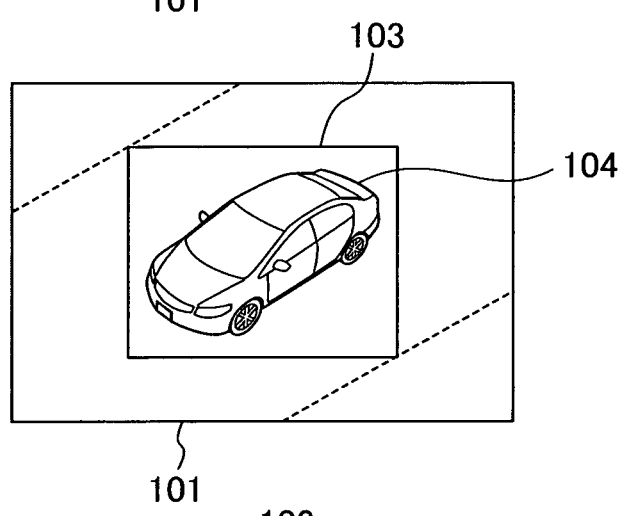
FIG. 15B is explanatory drawings showing examples of images which have been highly evaluated in an evaluation using the frequency distribution of the model image.
Figure 15C:
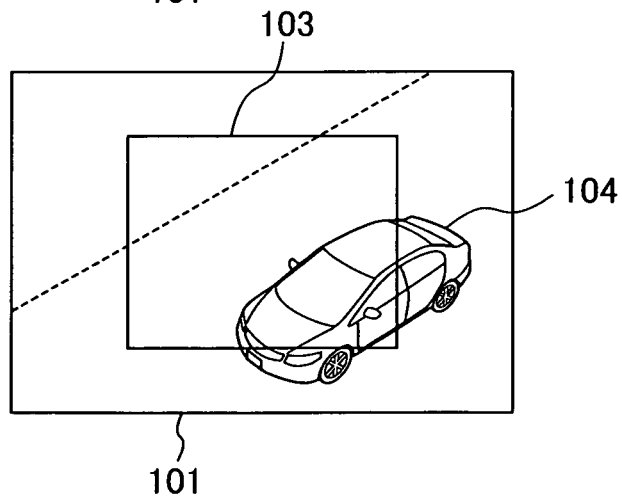
FIG. 15C is explanatory drawings showing examples of images which have been highly evaluated in an evaluation using the frequency distribution of the model image.

FIG. 15A, FIG. 15B and FIG. 15C are explanatory drawings showing examples of images which have been highly evaluated in an evaluation using a frequency distribution of a model image. Each of the images shown in FIG. 15A, FIG. 15B and FIG. 15C is an automobile 104 which is the main subject in the picture 101, recorded with the same size and from the same photographic angle. In the evaluation using the frequency distribution of a model image, the three images shown in FIG. 15A, FIG. 15B and FIG. 15C all had a high evaluation. In this case, the body side microcomputer 21 sets regions having a predetermined size in the vicinity of the center of the picture 101. In FIG. 15, an example is shown where a region 103 having a size of about 30% of the picture 101 is set in the vicinity of the center of the picture 101.

Next, the body side microcomputer 21 calculates the frequency distribution of the motion vectors in the image within the region 103 based on the frequency distribution of the motion vectors in the imaged image (image of the picture 101). Further, the body side microcomputer 21 calculates the model frequency distribution of the motion vectors in the model image within the region 103 based on the model frequency distribution of the motion vectors in the model image stored beforehand.

Then, the body side microcomputer 21 compares the frequency distribution of the motion vectors in the image in the region 103 with the model frequency distribution of the motion vectors in the model image in the region 103, and evaluates the image based on their similarity. Namely, the body side microcomputer 21 gives a high evaluation to an image having a frequency distribution with a high similarity to the model frequency distribution of the motion vectors in the model image, and adds a high number of points. In the example shown in FIG. 15, the frequency distribution of the motion vectors in the image of 15B is the frequency distribution with a high similarity to the model frequency distribution of the motion vectors in the model image in the region 103. Because of this, the body side microcomputer 21 gives a high evaluation to the image of FIG. 15B, and adds a high number of points.

Further, the body side microcomputer 21 may also use a model frequency distribution of the motion vectors in a model image stored beforehand in the storage portion 26 in the above evaluation. This is a model frequency distribution wherein a model image assumed to be a preferable image is set, within the region 103 of the vicinity of the center of the picture 101.

According to the present embodiment, it is possible to highly evaluate an image where the main subject is present in the center portion of the picture even when the size of the main subject within the picture and the angle of photography are the same.

1.3.6 Specific Example of Image Selection (2)

FIG. 16A and FIG. 16B are explanatory drawings showing examples of images which have been highly evaluated in an evaluation using a frequency distribution of a model image. In each of the images shown in FIG. 16A and FIG. 16B, the skater who is the main subject is recorded at the same position and at about the same size. In FIG. 16A and FIG. 16B, the left side drawing shows the imaged image, and the right side drawing shows the positions of the main blocks and sub-blocks within the segmented picture. In the left and right drawings, the picture 101 is segmented with the same proportions.

The body side microcomputer 21, for each image, divides the picture 101 into a plurality of blocks. Then, for each image, it specifies the blocks (below referred to as main blocks) which are in the vicinity of the center of the picture 101, and further which are not background. Next, the body side microcomputer 21 specifies blocks (below referred to as sub-blocks) which resemble the main blocks in color, and further have color continuity.

In FIG. 16, block A is specified as a main block. Block A in the present example is constituted of 3 blocks. In FIG. 16A, A1 is specified as a sub-block. In FIG. 16B, A1 to A5 are specified as sub-blocks.

Next, the body side microcomputer 21 calculates the frequency distribution of the motion vectors in the image of the sub-blocks for each image, based on the frequency distribution of the motion vectors in the imaged image (the image of the picture 101). In the image of FIG. 16A, the frequency distribution of the motion vectors in the image of sub-block A1 is calculated. In the image of FIG. 16B, the frequency distribution of the motion vectors in the image of sub-blocks A1 to A5 is calculated.

The body side microcomputer 21 reads out from the storage portion 26 the model frequency distribution of the motion vectors in a model image in the sub-blocks. The model frequency distribution of the motion vectors in a model image in the sub-blocks is a model frequency distribution of the motion vectors in a model image of a sub-block (below referred to as sub-block model image) with a color resembling the main block, and further, having continuity of color, in a model image which is assumed to be a preferable image.

Then, the body side microcomputer 21 compares the frequency distribution of the motion vectors in each sub-block of the image of FIG. 16A and FIG. 16B with the model frequency distribution of the motion vectors in the sub-block model image, and evaluates the image based on their similarity. In this evaluation, an image having a frequency distribution with a high similarity to the model frequency distribution of the motion vectors in the sub-block model image becomes an image with a high evaluation.

In sports photographs, it is assumed that a person who is the main subject is positioned in the vicinity of the center of the image, and it can be considered that the main block corresponds to the torso of a person, and the sub-blocks correspond to the limbs of the person. Thus, in sports photography, if it is taken that an instant where the limbs of a person make a large movement presents a good scene, then the greater the number of sub-blocks which are continuous with the main block, and the more the sub-blocks extend towards the periphery of the picture, the better the scene. In the present embodiment, the model frequency distribution of the motion vectors in the sub-block model image are set based on the number and position of sub-blocks in an image captured during an instant when the limbs of a person made a large movement as stated above.

Accordingly comparing the frequency distribution of the motion vectors in the sub-blocks, and the model frequency distribution of the motion vectors in the sub-block model image of the two images in FIGS. 16A and 16B, the frequency distribution of the motion vectors in the image of FIG. 16B where the limbs of the skater who is the main subject make a large extension, is a frequency distribution with a high similarity to the model frequency distribution of the motion vectors in the sub-block model image. Because of this, the body side microcomputer 21 evaluates the image of FIG. 16B more highly than the image of FIG. 16A, and adds a large number of points.

According to the present embodiment, even when the size and photographic angle in the picture of the main subject are the same, it is possible to more highly evaluate an image where the movement of the main subject is large. Namely, the larger the movement of the main subject, the greater the manifestation of characteristic changes in the frequency distribution of the motion vectors in the sub-blocks. Because of this, by carrying out an evaluation using the model frequency distribution of the motion vectors in the sub-block model image, it is possible to highly evaluate an image having greater movement of the main subject even for images where the main subject is recorded at the same position and at about the same size.

Further, the body side microcomputer 21 may also calculate the model frequency distribution of the motion vectors in the sub-block model image based on the model frequency distribution of the motion vectors in a model image stored beforehand. Further, the number of blocks which become main blocks is not limited to three. The number of blocks which become main blocks may be 1, or may be 4 or more. The number of the blocks which become main blocks will differ depending on the number of segments of the picture 101 and the size of the main subject.

1.3.7 Evaluation Using Histogram of Model Image (2)

Figure 17A:
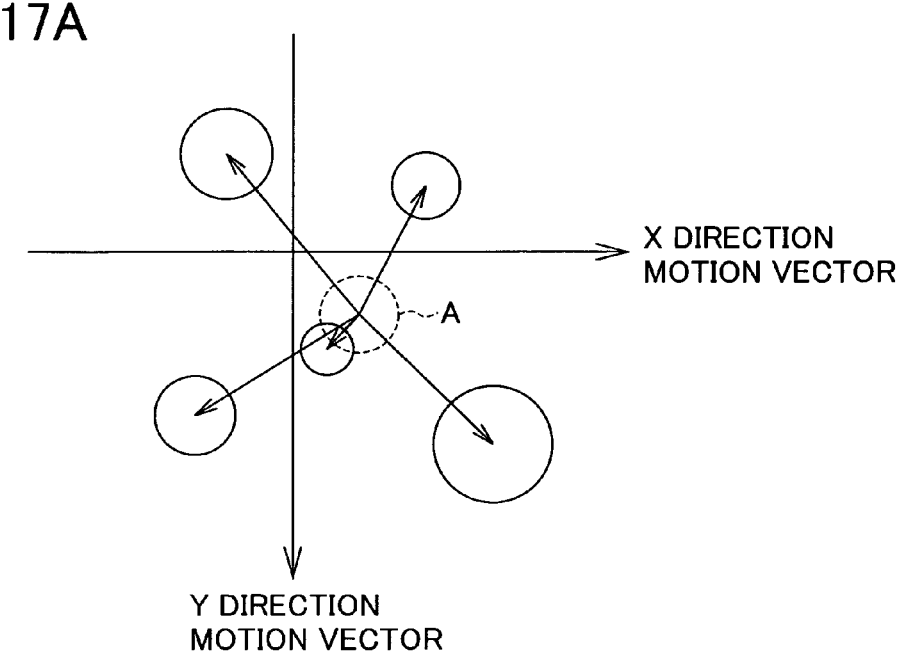
FIG. 17A is a conceptual drawing showing the frequency distribution of the motion vectors and its dispersion in the imaged image.
Figure 17B:
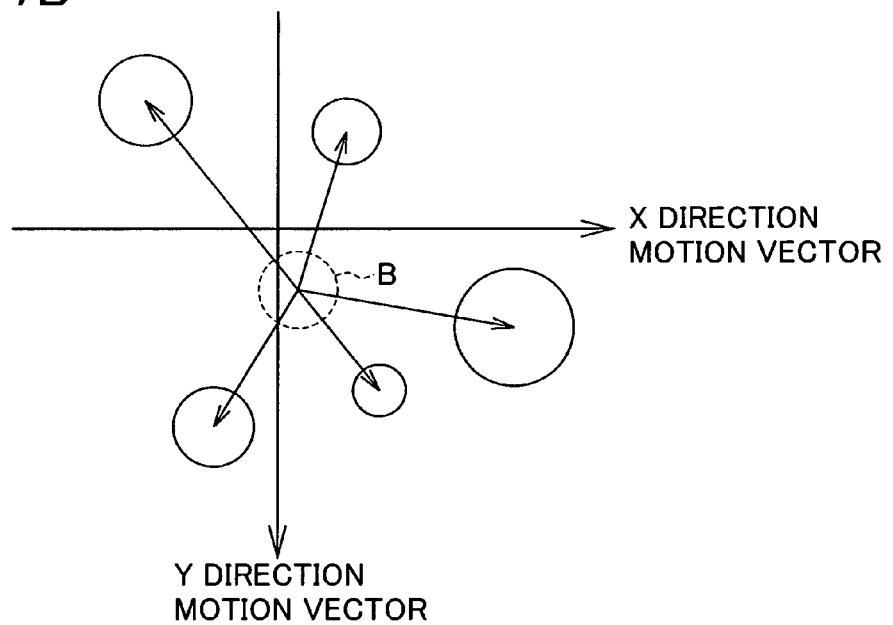
FIG. 17B is a conceptual drawing showing the model frequency distribution and its dispersion in the model image.

FIG. 17A is a conceptual drawing showing the frequency distribution of the motion vectors, and its dispersion, in an imaged image. FIG. 17B is a conceptual drawing showing a model frequency distribution, and its dispersion, in a model image. In the evaluation method of the present embodiment, the evaluation is carried out based on the similarity of the dispersion of the frequency distribution of the motion vectors in the imaged image and the dispersion of the frequency distribution in a model image.

First, the body side microcomputer 21 computes a frequency distribution of the motion vectors in the imaged image, and generates a histogram showing the frequency distribution of the motion vectors. Here, a histogram showing the frequency distribution of the motion vectors such as that shown in FIG. 17A is generated. In FIG. 17A, five peak frequencies showing the characteristics of the image (circles drawn with solid lines) are manifested.

Next, the body side microcomputer 21 calculates a peak frequency (below referred to as the average peak frequency) which is the average of the five peak frequencies included in the histogram. In FIG. 17A, the average peak frequency is shown with the circle drawn with a dotted line, assigned the reference letter A.

Next, the body side microcomputer 21 computes the difference between each of the five peak frequencies, and the average peak frequency A. This difference is referred to as the distance from the average peak frequency A to each peak frequency. Further, the body side microcomputer 21 totals the differences between the five peak frequencies and the average peak frequency. This total value is the dispersion of the frequency distribution of the motion vectors in the imaged image. The higher this dispersion, the more a plurality of subjects are moving in different directions with different speeds.

Next, the body side microcomputer 21 reads out the dispersion of the model frequency distribution of the motion vectors in the model image from the storage portion 26. This is the dispersion in a model image which is assumed to be a preferable image. Also for the model image, the dispersion is sought by calculating the difference between the peak frequencies and the average peak frequencies.

Then, the body side microcomputer 21 compares the dispersion of the frequency distribution of the motion vectors in the imaged image and the dispersion of the frequency distribution of the motion vectors of the model image, and judges their similarity. The body side microcomputer 21 gives a high evaluation to an image having a dispersion with a high similarity to the dispersion of the model frequency distribution of the motion vectors in the model image, and adds a high number of points. The body side microcomputer 21, for example, judges a high degree of similarity if the dispersion of the imaged image is 80 percent or higher when the dispersion of the model image is set to 100 percent.

According to the present embodiment, even if the number of peak frequencies are the same, it is possible to give a higher evaluation to an image wherein a plurality of subjects are moving in several directions at several speeds.

Further, the body side microcomputer 21 may calculate the dispersion in the model image based on the model frequency distribution of the motion vectors in the model image stored beforehand.

Furthermore, the body side microcomputer 21 may give a higher evaluation to an image when the dispersion of the frequency distribution of the motion vectors of the imaged image is equal to or greater than a threshold value. In this case, it is not necessary to judge the similarity of the dispersion with the model image. Because of this, the speed of processing by the body side microcomputer 21 can be increased, and the processing load can be reduced.

Further, the body side microcomputer 21 may extract only peak frequencies having a frequency amount equal to or greater than a threshold frequency when calculating the average peak frequency A from the peak frequencies of the imaged image. In this case, the body side microcomputer 21 computes the average peak frequency A from the peak frequencies having a frequency amount equal to or greater than the threshold, and then calculates the dispersion.

1.3.8 Evaluation by Change Amount in Frequency Amount of Peak Frequency

Figure 18A:
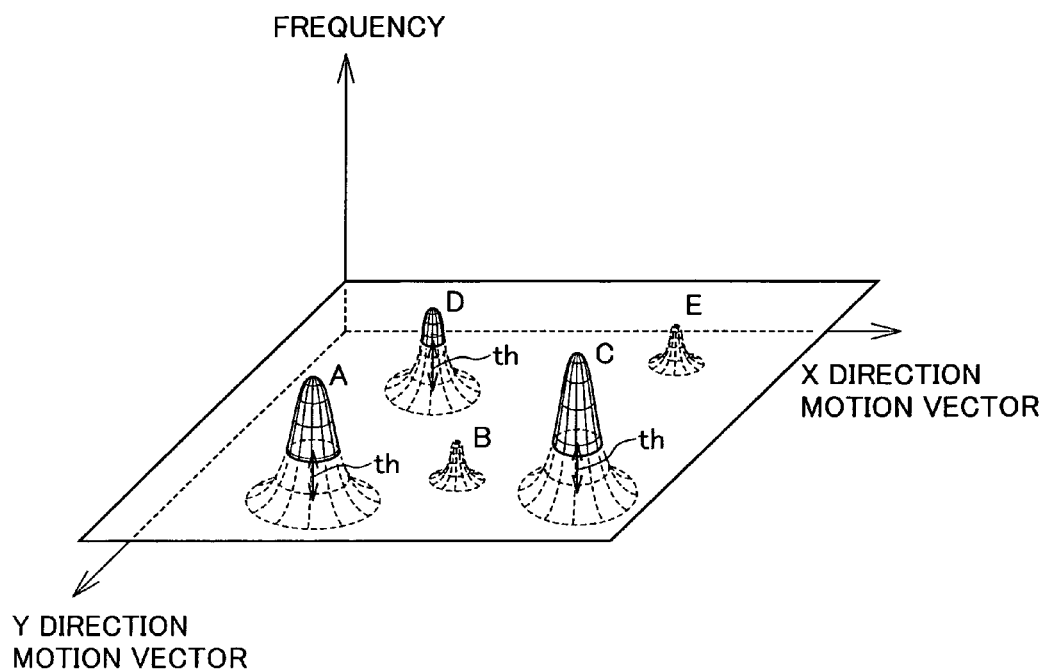
FIG. 18A is histograms showing the frequency distribution of the motion vectors in the images continuously imaged by the camera.
Figure 18B:
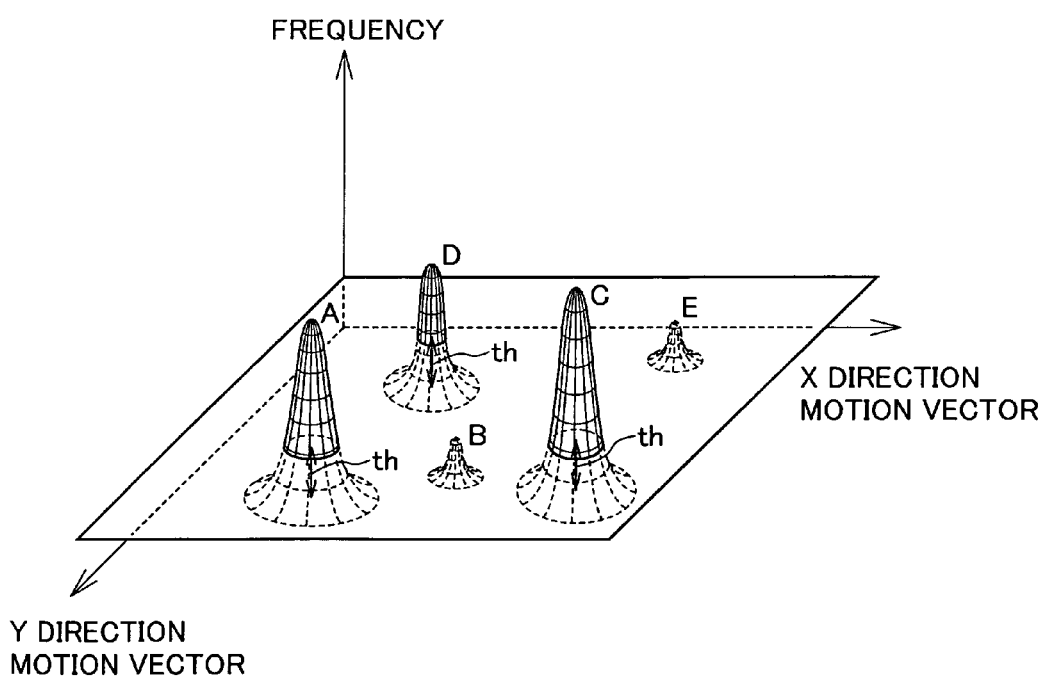
FIG. 18B is histograms showing the frequency distribution of the motion vectors in the images continuously imaged by the camera.

FIG. 18A and FIG. 18B are histograms showing the frequency distribution of the motion vectors in images imaged continuously by the camera 1. The camera 1 imaged the images in the order of FIG. 18A and FIG. 18B. In the evaluation method of the present embodiment, the frequency distributions of the motion vectors in the imaged images are computed, and evaluation of the images is carried out based on the change amount in the frequency amounts of the peak frequencies included in the frequency distributions.

First, the body side microcomputer 21 computes the frequency distributions of the motion vectors in the images imaged continuously by the camera 1 and generates histograms showing the frequency distributions of the motion vectors. Here, it generates histograms showing the frequency distributions of the motion vectors such as those shown in FIG. 18A and FIG. 18B. In the histograms shown in FIG. 18A and FIG. 18B, the five peaks A to E showing the characteristics of the respective images are manifested. The body side microcomputer 21 extracts the frequency distribution of the motion vectors formed by the peaks having a frequency amount equal to or greater than a threshold frequency from the histograms shown in FIG. 18A and FIG. 18B.

In FIG. 18A, among the five peak frequencies A to E, the peaks A, C and D have a frequency equal to or greater than the threshold frequency th. Further, the peaks B and E have frequencies which do not meet the threshold frequency th. The body side microcomputer 21 extracts the frequency distribution of the motion vectors formed by the peaks A, C and D having frequency amounts equal to or greater than the threshold frequency. Next, the body side microcomputer 21 observes the changes, in chronological sequence, in the frequency amounts of the peak frequencies A, C, and D. Then, the body side microcomputer 21, based on the change amount in the peak frequencies A, C and D, and an evaluation standard value set beforehand, carries out the evaluations of the images. The evaluation standard value is a value for judging the change amounts, in chronological sequence, in the frequency amounts in the peak frequencies having frequencies equal to or greater than the threshold frequency th.

The frequency amounts of the peak frequencies A, C, and D shown in FIG. 18A change by increasing as shown in FIG. 18B. The body side microcomputer 21 calculates the average value of the change amount in the frequency amounts (below referred to as average change amount Δave) for the three peak frequencies A, C, and D. Next, the body side microcomputer 21 compares the calculated average change amount Δave and an evaluation standard value Δth. Then, if the average change amount Δave exceeds the evaluation standard value Δth, the evaluation of that image is made high, and a large number of points is added.

Further, the evaluation of an image may be made high in the case that the change amount of the frequency amount in at least one peak frequency among the three peak frequencies A, C, and D exceeds an evaluation standard value Δth. Furthermore, the evaluation of an image may be made high in the case that the total value of the change amount of increase for the three peaks A, C and D, is calculated, and this total value exceeds an evaluation standard value (evaluation standard value for comparison with the total value).

According to the present embodiment, it is possible to more highly evaluate an image where, for example even if the subject is moving in the same way, the size of the subject suddenly increases (an image where the area occupied by the subject in the picture is large, under conditions of photographing a subject which is approaching at high speed). Further, according to this, it is possible to more highly evaluate an image where for example the moving subjects suddenly increase (an image wherein the overall surface area in a picture of subjects moving in the same way in an image increases by an increase in the number of subjects moving in the same way).

1.4 Learning Function of Evaluation Standard 1.4.1 Updating Frequency Distribution of Model Image In the embodiment of 1.3.3, an explanation was given for the evaluation of an image using a model frequency distribution of the motion vectors set beforehand as an evaluation standard of a preferable image (model image). This model frequency distribution of the motion vectors of the model image may be updated based on an image selected by the user.

When a user carries out an operation of image playback via an operating portion, not illustrated, the body side microcomputer 21 displays on the display panel 28 a plurality of images stored in the buffer 25. These images have been assigned an evaluation result. The body side microcomputer 21 displays in order on the display panel 28 a plurality of images stored in the buffer 25 in response to an operation of the operating portion, not illustrated, by the user. The user carries out an operation of selection via the operating portion, not illustrated, when a desired image is displayed on the display panel 28, and this image becomes the image selected by the user. The body side microcomputer 21 leaves the image selected by the user and its evaluation results in the buffer 25. Further, the body side microcomputer 21 if necessary deletes from the buffer 25 the non-selected images and their evaluation results. Below, an explanation is given of a learning function for updating the model frequency distribution of the motion vectors of the model image based on the image selected by the user.

Figure 19A:
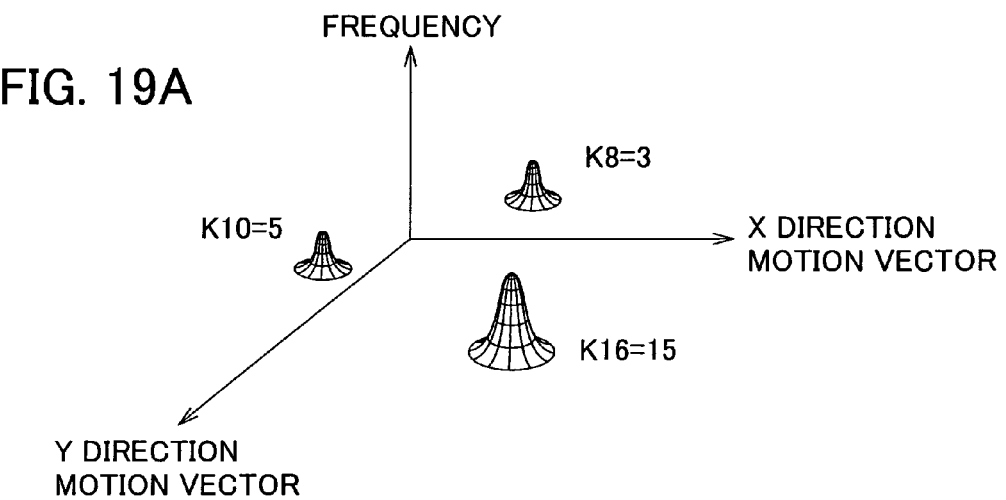
FIG. 19A is a histogram showing the model frequency distribution of the motion vectors in the model image.
Figure 19B:
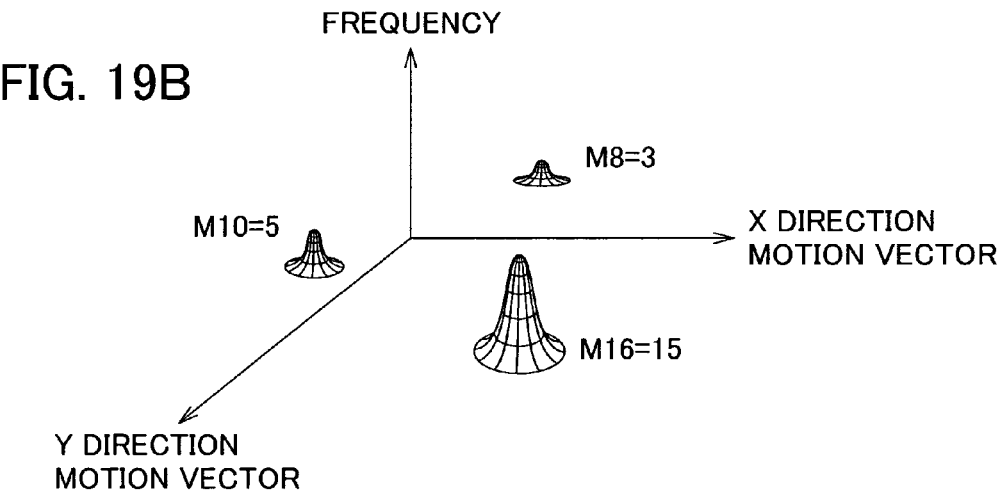
FIG. 19B is a histogram showing the frequency distribution of the motion vectors in the image which has been image-selected by the user.
Figure 19C:
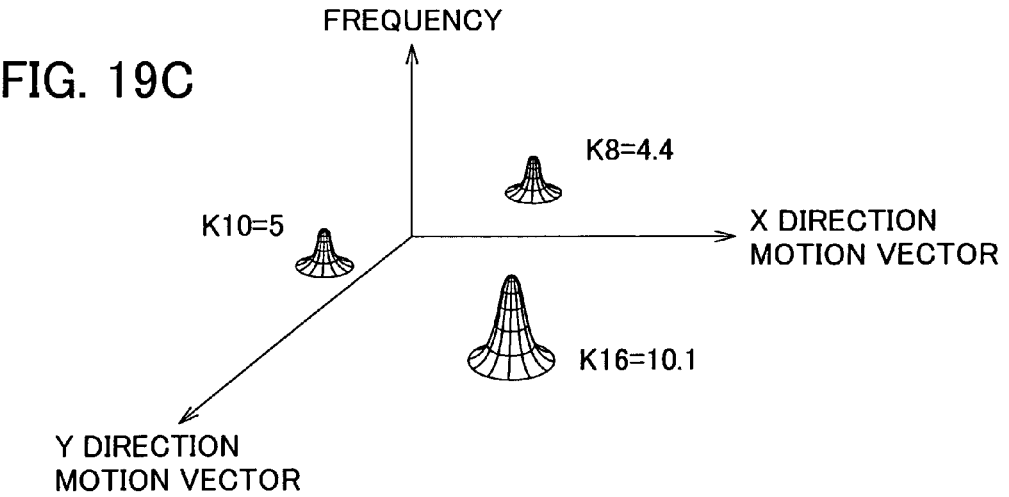
FIG. 19C is a histogram showing the model frequency distribution of the motion vectors in the updated model image.

FIG. 19A is a histogram showing the model frequency distribution of the motion vectors in the model image. FIG. 19B is a histogram showing the frequency distribution of the motion vectors in the image selected by the user. FIG. 19C is a histogram showing the model frequency distribution of the motion vectors in the updated model image. The reference numbers "K10", "M8" and the like shown in each drawing show the block numbers of the developed regions shown in FIG. 14. Further, the numbers assigned to the block numbers show the frequency amounts of the peak frequencies of the blocks.

The body side microcomputer 21 updates the model frequency distribution of the motion vectors in the model image based on the trend of the frequency distribution of the motion vectors in the image selected by the user. Whether the trend of the frequency distribution of the motion vectors in the image selected by the user is reflected in the model frequency distribution of the motion vectors in the model image can be appropriately set. The body side microcomputer 21 carries out a computation for each peak frequency as an updated frequency amount=k·A+(1−k)·B. Here, k is a coefficient. A is the frequency amount of the peak frequency in the image selected by the user. B is the frequency amount of the peak frequency in the model image.

As one example, k is set to 0.3. The frequency amount in the peak frequency of block No. K8 shown in the histogram of FIG. 19A becomes 5×0.7=3.5. The frequency amount of the peak frequency of block No. M8 shown in the histogram of FIG. 19B becomes 3×0.3=0.9. Accordingly, as shown by the histogram of FIG. 19C, the updated frequency amount of the peak frequency of block No. K8 becomes 3.5+0.9=4.4. When a computation is carried out in the same way for block No. K16, as shown by the histogram in FIG. 19C, the updated frequency amount of the peak frequency becomes 10.1. For block No. K10, the frequency amount remains the same as before the update.

The body side microcomputer 21 updates the model frequency distribution of the motion vectors of the model image based on the image selected by the user. The body side microcomputer 21 stores the updated model frequency distribution of the motion vectors of the model image in the storage portion 26. At this time, the model frequency distribution of the motion vectors of the model image before the update may be retained, or it may be written over (deleted).

In the present embodiment, the model frequency distribution of the motion vectors of the model image is updated based on the image selected by the user. According to the present embodiment, it is possible to highly evaluate an image which suits the user's tastes, in an evaluation of an image using a model frequency distribution of the motion vectors of a model image.

Further, the coefficient k can be appropriately set. In the case that the coefficient k is smaller, the characteristics of the model frequency distribution of the motion vectors of the model image can be more greatly reflected in the updated frequency amounts. In the case that the coefficient k is larger, the characteristics of the frequency distribution of the motion vectors of the image selected by the user can be more greatly reflected in the updated frequency amounts. In the case that k is 0.5, the characteristics of each frequency distribution can be reflected as an average in the updated frequency amounts.

In the case that the user selects a plurality of images, the body side microcomputer 21 adds all of the frequency amounts of each peak of the frequency distribution of the motion vectors in each image selected by the user and calculates their average value (below referred to as the average frequency amount). Then, the body side microcomputer 21 calculates the updated frequency amounts based on this average frequency amount.

Further, in the case that the user selects a plurality of images, the model frequency distribution of the motion vectors of the model image may be updated for each image. For example, it is taken that an image of a skier jumping in midair (airborne) is stored in the storage portion 26 as the model frequency distribution of the motion vectors of the model image. The user selects from a plurality of images three images of "instant of jumping", "airborne", and "just before landing". In this case, the body side microcomputer 21 will update the model frequency distribution of the motion vectors in the model image (airborne) based on the frequency distribution of the motion vectors in the each of the three images. In this way, it is possible to generate three model frequency distributions of the motion vectors of the model images, updated based on the frequency distributions of the motion vectors of each of the three images.

The model frequency distributions of the motion vectors in these three model images are stored in the storage portion 26 along with the model frequency distribution of the motion vectors of the model image (airborne) which becomes the basic model image. In this way, the model frequency distribution of the motion vectors in the model image (airborne), which becomes the base image, is updated, and the user customizations 1 to 3 are generated.

1.4.2 Updating of the Dispersion

In the embodiment of 1.3.7, an explanation was given for evaluating an image based on the dispersion in a model image. The dispersion of the frequency distribution in the model image may be updated based on an image selected by the user.

Figure 20A:
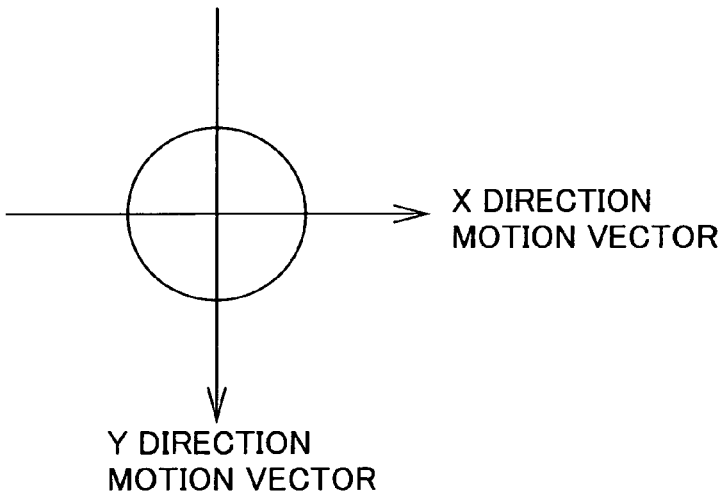
FIG. 20A is a conceptual drawing of the histogram showing the model frequency distribution of the motion vectors in the model image.
Figure 20B:
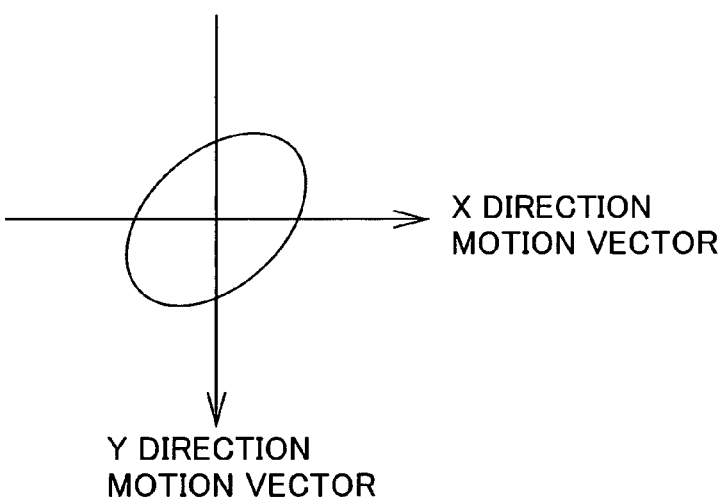
FIG. 20B is a conceptual drawing of the histogram showing the frequency distribution of the motion vectors in the image which has been image-selected by the user.
Figure 20C:
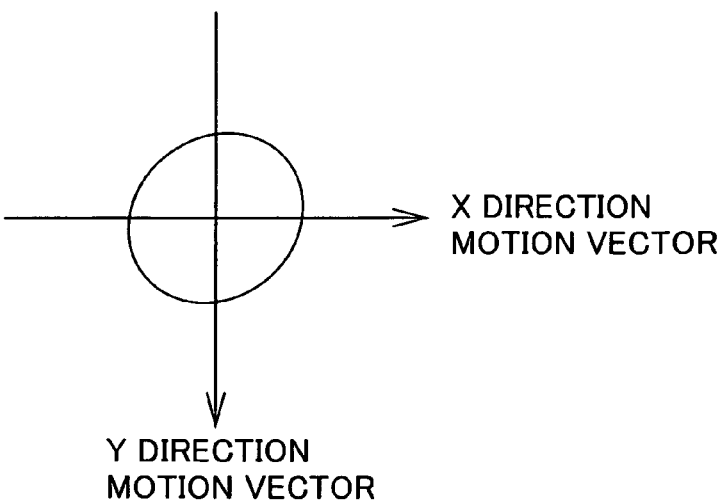
FIG. 20C is a conceptual drawing of the histogram of the model frequency distribution of the motion vector in the model image with the updated dispersion.

FIG. 20A is a conceptual drawing of a histogram showing the model frequency distribution of the motion vectors in a model image. FIG. 20B is a conceptual drawing of a histogram showing the frequency distribution of the motion vectors in an image selected by the user. FIG. 20C is a conceptual drawing of a histogram showing the model frequency distribution of the motion vectors in a model image where the dispersion has been updated. Each of the drawings of FIG. 20 schematically shows the dispersion of the peak frequencies included in each histogram by an outline of the distribution in order to facilitate the explanation.

The body side microcomputer 21 updates the dispersion of the model frequency distribution of the motion vectors set beforehand as the evaluation standard of a preferable image (model image), based on the dispersion of the frequency distribution of the motion vectors in an image selected by the user. How the dispersion of the frequency distribution of the motion vectors in the image selected by the user is reflected in the dispersion of the model frequency distribution of the motion vectors in the model image can be appropriately set. For example, a relational expression comprising the respective dispersions and coefficients may be used, in the same way as in the embodiment of 1.4.1.

In the present embodiment, an explanation will be given for an example where a dispersion which is intermediate between the above two dispersions is calculated. Namely, the body side microcomputer 21 calculates a dispersion which is intermediate between the dispersion of the model image shown in FIG. 20A and the dispersion of the selected image shown in FIG. 20B. In this way, the body side microcomputer 21 obtains a dispersion of a model image with an updated dispersion such as that shown in FIG. 20C. The body side microcomputer 21 stores the model frequency distribution of the motion vectors of the image where the dispersion has been updated, in the storage portion 26. At this time, the model frequency distribution of the motion vectors of the model image before the update may be retained, or may be overwritten (deleted).

In the present embodiment, the dispersion of the frequency distribution in the model image can be updated based on an image selected by the user. According to the present embodiment, it is possible to increase the evaluation of an image which meets the user's preferences in the evaluation of an image using the dispersion of the model frequency distribution of the motion vectors of a model image.

1.4.3 Updating the Frequency Amounts in the Model Image

In the embodiment of 1.3.7, the frequency amount of the peak frequency included in the frequency distribution of the motion vectors in the model image may be updated based on an image selected by the user.

Figure 21A:
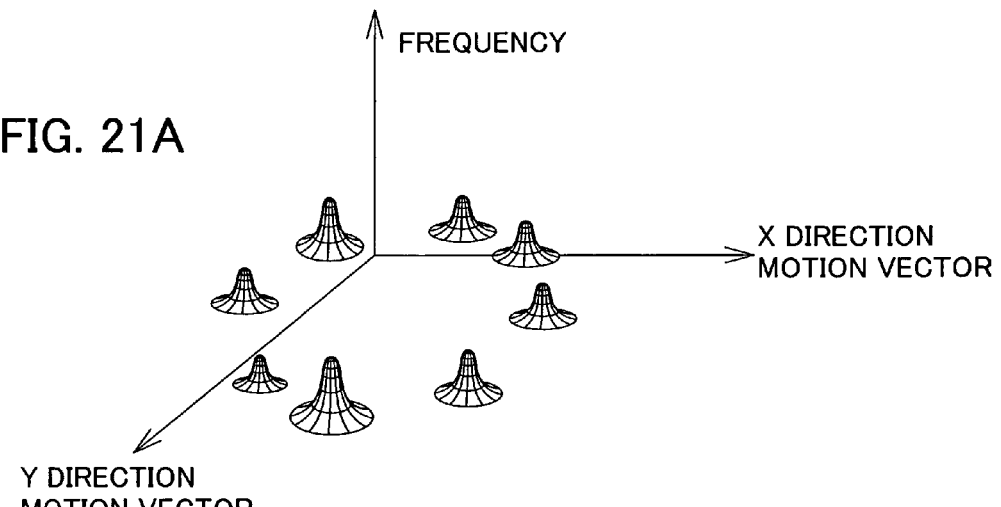
FIG. 21A is a conceptual drawing of the histogram showing the model frequency distribution of the motion vectors in the model image.
Figure 21B:
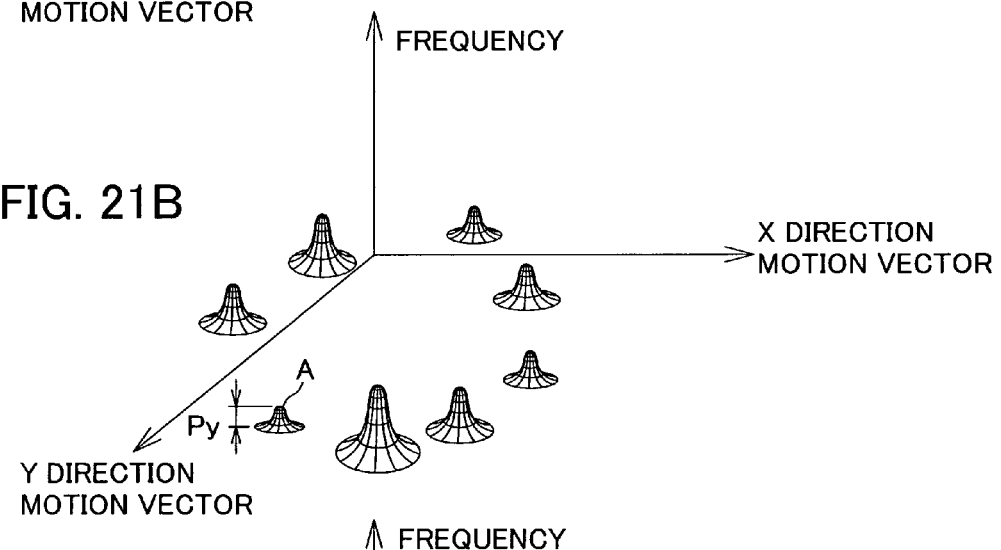
FIG. 21B is a conceptual drawing of the histogram showing the frequency distribution of the motion vectors in the image which has been image-selected by the user.
Figure 21C:
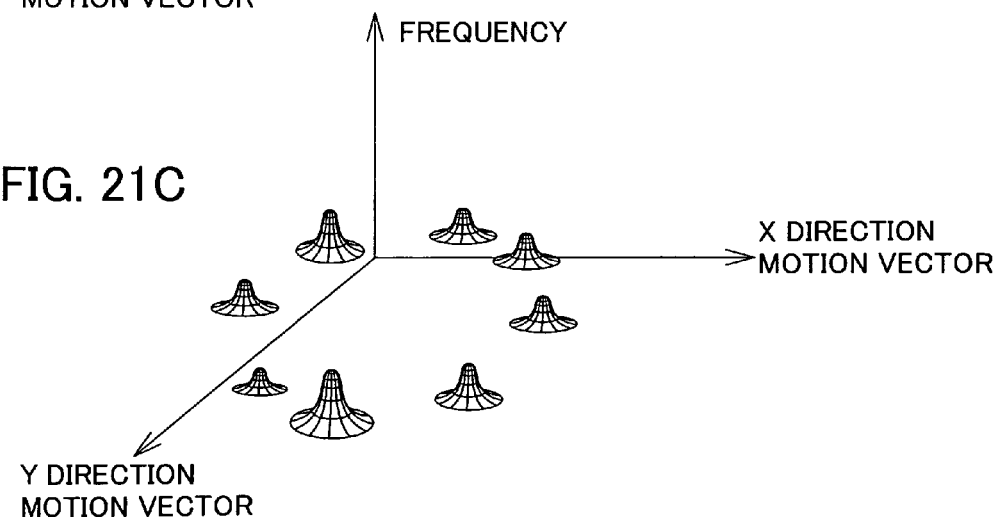
FIG. 21C is a conceptual drawing of a histogram showing the model frequency distribution of the motion vectors in the model image with the updated peak frequency.

FIG. 21A is a conceptual drawing of a histogram showing a model frequency distribution of the motion vectors in a model image. FIG. 21B is a conceptual drawing of a histogram showing the frequency distribution of the motion vectors in an image selected by the user. FIG. 21C is a conceptual drawing of a histogram showing a model frequency distribution of the motion vectors in a model image with updated peak frequencies. Each drawing of FIG. 21 conceptually shows the peak frequencies which are distributed most to the outside of the respective frequency distributions.

The body side microcomputer 21 updates the frequency amounts of the peak frequencies included in the model frequency distribution used when defining the model frequency distribution of the motion vectors in the model image, based on the frequency amounts of the peak frequencies included in the frequency distribution of the motion vectors in the image selected by the user.

In the camera 1 a histogram showing the model frequency distribution of the motion vectors in a the model image, such as that shown in FIG. 21(a), is stored in the storage portion 26. The body side microcomputer 21 extracts the peak frequencies having a frequency amount equal to or greater than a threshold value based on the frequency distribution of the motion vectors in an image selected by the user. By means of this, the body side microcomputer 21 generates a frequency distribution of the motion vectors formed of the peak frequencies having frequency amounts equal to or greater than the threshold frequency, as shown in FIG. 21B. Next, the body side microcomputer 21 extracts the peak frequency having the smallest frequency amount from among the frequency distribution shown in FIG. 21B. In FIG. 21B, the peak frequency having the smallest frequency amount is the frequency amount Py of the peak frequency A.

The body side microcomputer 21 updates the frequency amounts of all the peak frequencies included in the model frequency distribution of the motion vectors in the model image based on the frequency amount Py of the peak frequency A included in the frequency distribution of the motion vectors of the image selected by the user, shown in FIG. 21B. Further, how the frequency amount Py of the peak frequency A should be reflected in the update of the frequency amount of the peak frequencies in the model image can be appropriately set. For example, the equation: updated frequency amount=k·A+(1−k)·B may be used, in the same way as in the embodiment of 1.4.1.

The body side microcomputer 21, as shown in FIG. 21C, generates a model frequency distribution of the motion vectors in the model image with updated frequency amounts of all the peak frequencies. The body side microcomputer 21 stores the model frequency distribution of the motion vectors of the updated model image in the storage portion 26. At this time, the model frequency distribution of the motion vectors of the model image before the update may be retained, or may be overwritten (deleted).

In the present embodiment, the frequency amounts of the peak frequencies included in the model frequency distribution of the motion vectors of the model image are updated based on the frequency amounts of the peak frequencies included in the frequency distribution of the motion vectors in an image selected by the user. According to the present embodiment, it is possible to increase the evaluation of an image which meets the user's preferences in the evaluation of an image using the model frequency distribution of the motion vectors of a model image.

1.4.4 Updating the Threshold Frequency

In the embodiment of 1.3.8, the threshold frequency may be updated based on the frequency amounts of the peak frequencies included in the frequency distribution of the motion vectors of an image selected by the user.

For example, in the peak frequencies included in the frequency distribution of the motion vectors of an image selected by the user, the smallest frequency amount is set to h1. With respect to this, the threshold frequency th which was set beforehand is taken to be a frequency amount such that th>h1. In this case, the body side microcomputer 21 calculates the new threshold frequency th' as th'=th+h1/2. By means of this, the threshold frequency th' becomes a frequency amount between th and h1. The body side microcomputer 21 stores the new threshold frequency th' in the storage portion 26 as the updated threshold frequency th.

In FIG. 18A, the frequency amount h2 of the peak frequency E is less than the threshold frequency th before the update, and further, is taken to be close to th. By reducing the threshold frequency th by the update, the frequency amount of the peak frequency E becomes higher than the updated threshold frequency th. Because of this, the peak frequency E is extracted along with the peak frequencies A, C, and D.

Further, the threshold frequency th set beforehand may be updated based on the largest frequency amount in the peak frequencies included in the frequency distribution of the motion vectors of the image selected by the user.

According to the present embodiment, it is possible to carry out an extraction to reflect the characteristics of an image preferred by the user when extracting the peak frequencies included in the frequency distribution of the motion vectors of the image selected by the user.

Further, in the embodiment according to 1.3.8, the evaluation standard value $\Delta$th may be updated based on the change amount of the frequency amount of the peak frequencies included in the frequency distribution of the motion vectors of the image selected by the user. For example, in the average change $\Delta$ave of the frequency amount of the peak frequency included in the frequency distribution of the motion vectors of the image selected by the user, the new evaluation standard value $\Delta$th' is calculated from $\Delta$th'=$\Delta$ave+$\Delta$th/2. By means of this, the evaluation standard value $\Delta$th' becomes a value intermediate between $\Delta$ave and $\Delta$th. The body side microcomputer 21 stores the new evaluation standard value $\Delta$th' as the updated evaluation standard value $\Delta$th in the storage portion 26.

When carrying out the updating of the evaluation standard value $\Delta$th as described above, the evaluation of the image is carried out as follows. Namely, in the case that the average change $\Delta$ave of the frequency amounts in the image selected by the user is less than the evaluation standard value $\Delta$th before the update, the updated evaluation standard value is lowered. In this case, even for an image where the movement of the subject is not sudden, this image is highly evaluated. Further, in the case that the average change $\Delta$ave of the frequency amounts in the image selected by the user is greater than the evaluation standard $\Delta$th before the update, the evaluation standard value $\Delta$th before the update is raised. In this case, images with more sudden movement of the subject will be more highly evaluated.

According to the present embodiment, the evaluation standard value $\Delta$th used when judging the change amount in chronological sequence of a frequency amount is updated based on the average change $\Delta$ave of the frequency amounts of the image selected by the user, and therefore, is it possible to carry out the evaluation to reflect the characteristics of an image preferable to the user.

1.5 Concerning the Learning of Evaluation Methods 1.5.1 Automatic Learning of Evaluation Method In the present embodiment, an explanation is given for the case of changing the weighted evaluation method based on the continuity of the evaluation results.

The body side microcomputer 21 of the present embodiment carries out an evaluation with respect to one image, using evaluation methods A, B, and C which differ from each other. Namely, the body side microcomputer 21 evaluates one image by the evaluation methods A, B, and C, and assigns to the image evaluation results for each evaluation method as additional information. The body side microcomputer 21 stores the image with the assigned evaluation results in the buffer 25.

The body side microcomputer 21, for example, executes the reevaluation by the evaluation methods A, B, and C when storing to the memory card 20 the image stored in the buffer 25. FIG. 22 is a conceptual drawing showing the imaged image and its evaluation results. In the initial settings, the weightings of the evaluation methods are all set to "1".

As shown in FIG. 22, all of the three continuous images 2, 3 and 4, have evaluation results according to the method A which are higher than the evaluation results according to the other methods B and C. In this case, the body side microcomputer 21 increases the weighting of the evaluation method A to "1.5". In the present example, the value of the weighting is increased by 50%. The weightings of the other evaluation methods B and C remain at "1". In this way, in the evaluations of the images after 4, the evaluation results according to the evaluation method A are more highly reflected in the evaluation than the evaluation results according to the other methods B and C.

Further, in the evaluation of the images after 4, if a case arises where the evaluation results according to a same evaluation method, for three continuous images, is higher than the evaluation results according to the other evaluation methods, the body side microcomputer 21 increases the weighting of this evaluation method. Then, the evaluation of the later images is carried out. Further, in the case that an evaluation result according to the same evaluation method in the three (or plurality of) continuous images first indicated are higher than the evaluation results according to the other evaluation methods, the weighting of the evaluation method may be changed, without subsequently changing the weighting of the evaluation methods.

In the present embodiment, in the case that there are three continuous images having a higher evaluation result which is higher according to a same evaluation method than the evaluation results according to the other methods (below referred to as the specified images), the weighting of this evaluation method is increased. However, the specified images are not limited to three continuous images, and can be arbitrarily set.

According to the present embodiment, evaluations according to a preferable evaluation method which assigns high evaluations to a plurality of continuous images can be reflected in the evaluations of subsequent images.

1.5.2 Automatic Learning of Evaluation Method (2)

In the present embodiment, an explanation is given for the case of changing the weighting of an evaluation method based on the proportion of high evaluation results assigned, when carrying out the evaluation by a plurality of evaluation methods.

The body side microcomputer 21 of the present embodiment carries out an evaluation with respect to one image, using evaluation methods A, B, and C which differ from each other. Namely, the body side microcomputer 21 evaluates one image by the evaluation methods A, B, and C, and assigns to the image evaluation results for each evaluation method as additional information. The body side microcomputer 21 stores the image with the assigned evaluation results in the buffer 25.

The body side microcomputer 21, for example, executes the reevaluation by the evaluation methods A, B, and C when storing to the memory card 20 the images stored in the buffer 25. FIG. 23 is a conceptual drawing showing the imaged images and their evaluation results. In the initial settings, the weightings of the evaluation methods are all set to "1".

As shown in FIG. 23, in the five images 1 to 5, the evaluation method B, for image 1, image 3 and image 4, assigned a higher evaluation than the other evaluation methods A and C. Moreover, the proportion of images to which a high evaluation was assigned, namely the number of images to which a high evaluation was assigned, is higher than for the other evaluation methods. In this case, the body side microcomputer 21 increases the weighting of the evaluation method B to "1.5" In this example, the weighting was increased by 50%. The weightings of the other evaluation methods A and C remain at "1". By this means, in the evaluation subsequent to image 5, the evaluation results according to the evaluation method B are reflected so that the evaluation is higher than for the evaluation results of the other evaluation methods A and C. After this, evaluation for the five images is carried out in the same way again, and the weighting of the evaluation methods are changed.

In the present embodiment, the judgment of an evaluation method giving a high evaluation was carried out for five images, but without being limited to this, it can be arbitrarily set. Further, processing may be carried out as in the following. The body side microcomputer 21 reads out from the buffer 25 a number of images corresponding to from a certain percent of the total to a higher percent of the total. The body side microcomputer 21 extracts the evaluation method which gives higher evaluations than other evaluation methods from among these images, and further has the largest number of images with high evaluations. The body side microcomputer 21 changes the weighting of the extracted evaluation method.

According to the present embodiment, an evaluation according to a preferable evaluation method which gives a high evaluation to many images can be made to reflect in the evaluation of later images.

1.5.3 Learning of Evaluation Method Based on Image Selected by User

In the present embodiment, an explanation is given for the case of changing the weighting of an evaluation method based on an image selected by the user, when carrying out evaluation by a plurality of evaluation methods.

The body side microcomputer 21 of the present embodiment, in the same way as in the embodiment of 1.5.1, carries out an evaluation with respect to one image, using evaluation methods A, B, and C which differ from each other. Namely, one image is respectively evaluated by three evaluation methods, and the evaluation results for each evaluation method, as well as the total evaluation results, are added as additional information.

The body side microcomputer 21 stores in the buffer 25 the images with the attached evaluation results. The body side microcomputer 21 displays on the display panel 28 a plurality of images stored in the buffer 25 when the user carries out an image playback operation via the operating portion, not illustrated. These images have evaluation results attached to them. The body side microcomputer 21 reads out in order the plurality of images stored in the buffer 25, and displays them on the display panel 28 for only a predetermined time (a plurality of images stored in the buffer 25 may be displayed in order on the display panel 28 in response to an operation of the operating portion, not illustrated, by the user).

When the user carries out an operation of a selection via the operating portion, not illustrated, when an image is displayed on the display panel 28, that image becomes the image selected by the user. The body side microcomputer 21 stores the image for which the selection indication was made by the user (below referred to as the selected image) and its evaluation result in the memory card 20. The body side microcomputer 21 increases the weighting of the evaluation method which gives a high evaluation to the selected image.

The body side microcomputer 21, after the number of selected images has reached a predefined number (10 images in the present embodiment), reevaluates the remaining images according to the evaluation methods A, B, and C, with the changed weighting. The body side microcomputer 21 selectively displays on the display panel 28 images which have been given a high evaluation among the reevaluated images. Namely, after the number of images selected by the user has reached 10, the images which have been given a low evaluation are not displayed on the display panel 28. After this, when an operation of selection by the user for the images displayed on the display panel 28 is carried out, the body side microcomputer 21 stores the selected images and their evaluation results in the memory card 20. Further, the body side microcomputer 21 increases the weighting of the of the image evaluation method which gives a high evaluation to the selected images. Then, the body side microcomputer 21 repeatedly executes the above processing until there are no images stored in the buffer 25.

Figure 24:
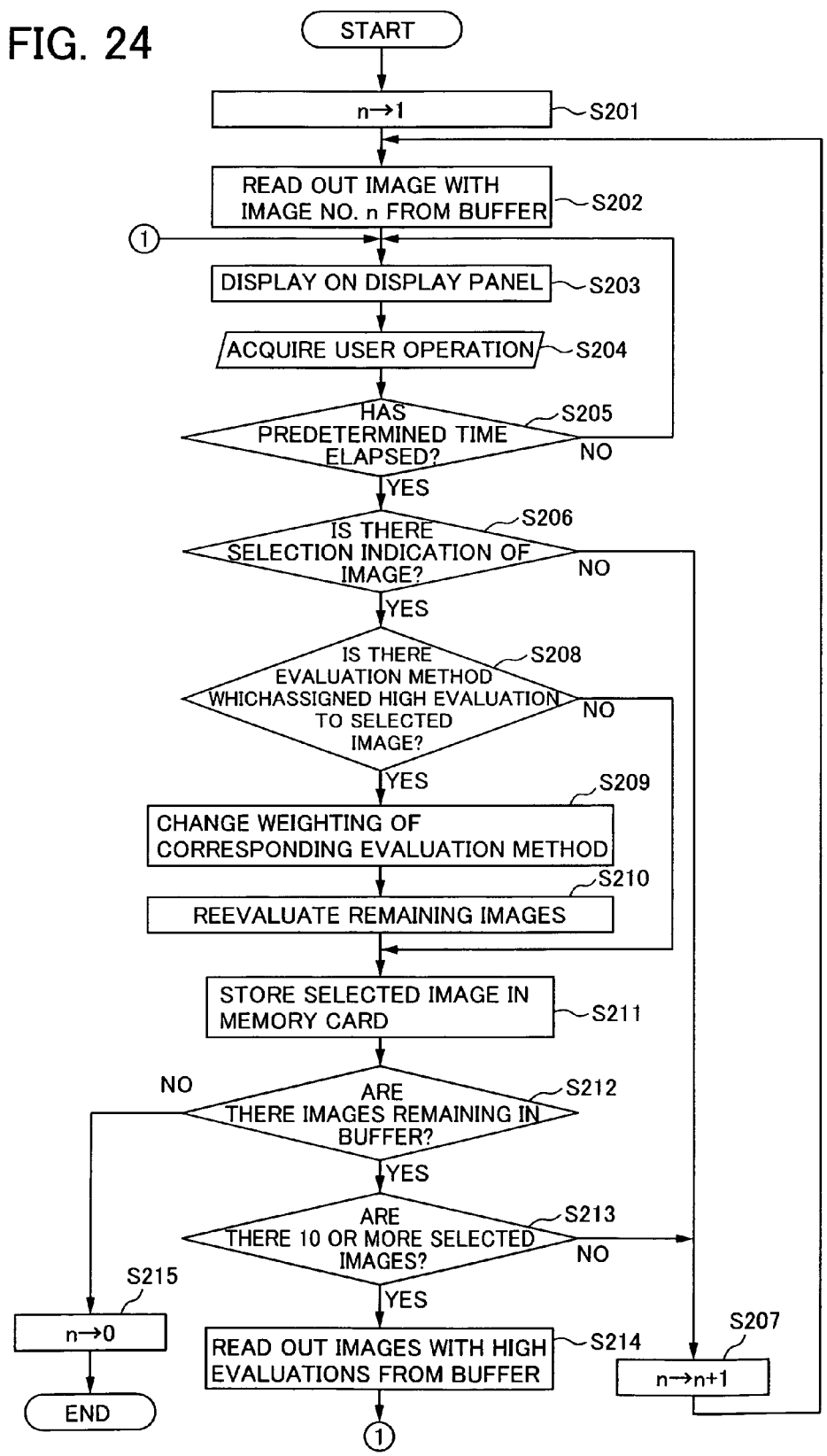
FIG. 24 is a flowchart showing the procedure for the case of changing the weighting of the evaluation method based on the image selected by the user in embodiment 1.

Next, an explanation is given with reference to the flowchart shown in FIG. 24 of the procedure for the case of changing the weighting of the image evaluation based on the images selected by the user. The processing of the flowchart shown in FIG. 24 is executed by the body side microcomputer 21. In the present embodiment, the weighting of the evaluation method A is W1, the weighting of the evaluation method B is W2, and the weighting of the evaluation method C is W3. In the initial settings, the weightings of all three of these evaluation methods is "1". The total evaluation result E for each single image is expressed by the formula (1) below.

$$E = W1 \times (\text{evaluation method } A) + W2 \times (\text{evaluation method } B) + W3 \times (\text{evaluation method } C) \quad (1)$$

In Step S201, the body side microcomputer 21 sets to 1 the image No. n read out from the buffer 25. In Step S202, the body side microcomputer 21 reads out the image of image No. n from the buffer 25. In Step S203, the body side microcomputer 21 displays on the display panel 28 the read out image. At this time, the body side microcomputer 21 starts clocking by a timer, not illustrated.

In Step S204, the body side microcomputer 21 obtains a user operation via the operating portion, not illustrated. Here, carrying out a selection indication of an image is taken as the user operation. In Step S205, the body side microcomputer 21 judges whether the clocking by the timer, not illustrated, has passed a predetermined time. If the judgment of Step S205 is NO, then the body side microcomputer 21 returns to Step S203. If the judgment of Step S205 is YES, the body side microcomputer 21 proceeds to Step S206.

In Step S206, the body side microcomputer 21 judges whether there is a selection indication of an image by the user. If the judgment of Step S206 is NO, the body side microcomputer 21 proceeds to Step S207. In Step S207, the body side microcomputer 21 sets the image number n as n+1, and returns to Step S202. If the judgment of Step S206 is YES, the body side microcomputer 21 proceeds to Step S208.

In Step S208, the body side microcomputer 21 judges whether there is an evaluation method which gives high evaluations to the selected images. If the judgment in Step S208 is YES, the body side microcomputer 21 proceeds to Step S209. In Step S209, the body side microcomputer 21 changes the weighting of the evaluation method which gives high evaluations to the selected images. In Step S210, the body side microcomputer 21 reevaluates the remaining images according to Formula (1) with the changed weightings.

In Step S211, the body side microcomputer 21 stores in the memory card 20 the selected images and their evaluation results. In Step S212, the body side microcomputer 21 judges whether there are images remaining in the buffer 25. If the judgment of Step S212 is YES, the body side microcomputer 21 proceeds to Step S213. In Step S213, the body side microcomputer 21 judges whether the number of selected images is greater than 10.

If the judgment in Step S213 is NO, the body side microcomputer 21 proceeds to Step S207. Namely, in the case that the number of selected images has not reached 10, the body side microcomputer 21 reads out the next image from the buffer 25. If the judgment in Step S213 is YES, the body side microcomputer 21 proceeds to Step S214.

In Step S214, the body side microcomputer 21 searches in order the images stored in the buffer 25 and reads out the images with high evaluations. The body side microcomputer 21 refers to the evaluation results added to the images, and reads out the images with a total evaluation result equal to or greater than a predetermined number of points. Following Step S214, the body side microcomputer 21 proceeds to Step S203. By this means, after the number of selected images is 10 or more, only the images having a high evaluation are displayed on the display panel 28.

If the judgment in Step S212 is NO, the body side microcomputer 21 proceeds to Step S215. In Step S215, the body side microcomputer 21 sets the image number n to zero, and the processing of the present flowchart is concluded.

Further, in the processing according to the above flowchart, regardless of the number of selected images, all of the images stored in the buffer 25 may be read out in order and displayed on the display panel 28.

In the present embodiment, the weighting of the evaluation methods is changed based on images selected by the user, and the remaining images are reevaluated. According to the present embodiment, it is possible to gradually display images which agree with the preferences of the user, after a predetermined number of displayed images has been exceeded. Because of this, it is possible to shorten the time for the sorting of images by the user when replaying photographed images. Further, in subsequent photography, it is possible to increase the evaluation of images which agree with the users preferences.

1.6 Concerning Feedback of the Evaluation Results

The body side microcomputer 21 feeds back to the user evaluation results of the photographed images so as to be useful for subsequent photography. Two embodiments are explained below.

1.6.1 Self-Correction of Photographic Conditions

The present embodiment carries out processing to automatically correct the photographic conditions during photography, for example when continuously photographing a plurality of images while the release button is being held pressed. Because of this, the body side microcomputer 21, as processing of the photographic condition correction portion, executes processing which corrects the conditions when imaging at the imaging sensor 7, based on evaluation items when there are evaluation items which require correction among the evaluation results of a plurality of images stored in the buffer 25. Here, the conditions when imaging includes various conditions such as the exposure conditions such as the aperture value, shutter speed and the like, focus adjustment, and photographic sensitivity, and the like.

For example, it will be taken that the exposure is outside of the correct range in the evaluation results for the first 10 images during continuous photography. The body side microcomputer 21, in the case that the points for the evaluation item of the exposure are low, appropriately changes the exposure conditions such as the aperture value and shutter speed or the like, for the 11th and later photographs, to correct so that the exposure becomes suitable. In this way, for example, in the case of carrying out continuous photography of 50 images, even if the exposure of the first 10 photographs is not suitable, it is possible to obtain suitably exposed images for the later 40 photographs. Such a correction may also be repeatedly executed during continuous photography, for example every 10 images.

In the present embodiment, an explanation was given for the case of changing the exposure conditions, but the focus adjustment, photographic sensitivity, and the like may also be corrected, and a plurality of conditions may also be corrected at the same time. Further, such a correction of photographic conditions may be applied to a mode which continuously makes a plurality of photographs with one press of the release button.

1.6.2 Suggestion of Preferable Settings, Operations and the Like

The present embodiment suggests to the user settings, operations or the like to photograph the optimal images, based on the evaluation results of images. Because of this, the body side microcomputer 21, as a processing of a correction information extraction portion, analyzes the evaluation results of images stored in the buffer 25, and executes processing to extract correction information to further increase the evaluation results of these images. Next, the body side microcomputer 21 executes processing to display on the display panel 28 this correction information. Here, the correction information comprises one or a plurality of items of information, and includes voice and the like, in addition to message displays of letters and numbers, bar graph displays, graphic displays and the like.

Figure 25:
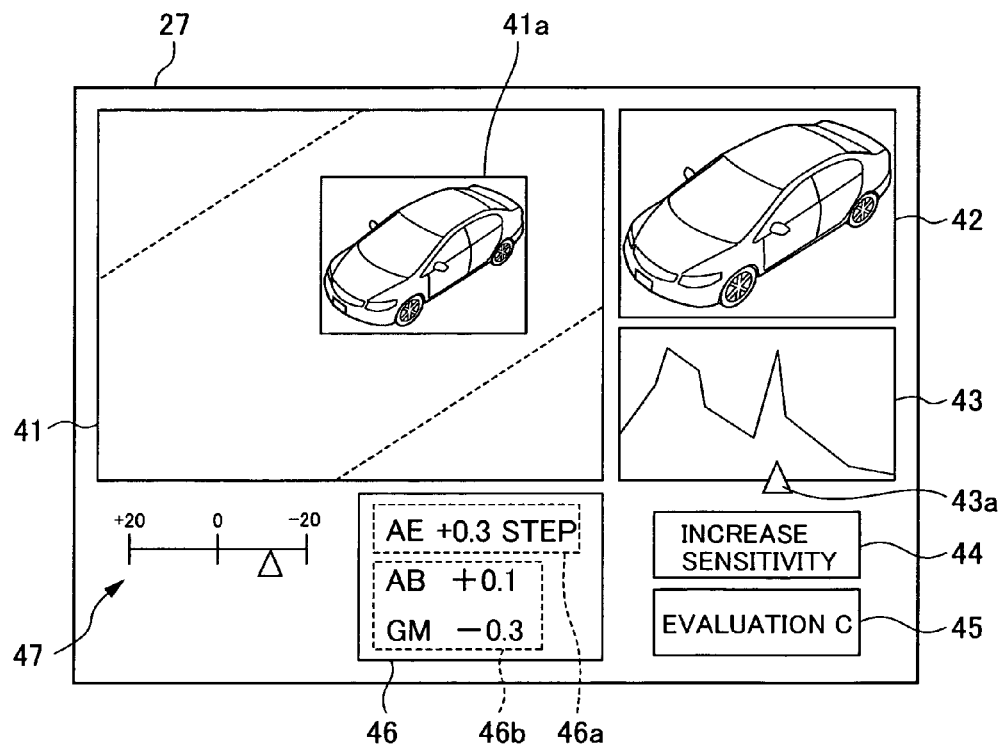
FIG. 25 is a conceptual drawing showing one example of the image evaluation screen displayed on the display panel.

FIG. 25 is a conceptual drawing showing one example of an image evaluation screen displayed on the display panel 28. On this display panel 28, usually the aperture value, shutter speed, photographic mode and the like are displayed. Further, a screen such at that shown in FIG. 25 is displayed when the user selects the item of the image evaluation mode in a menu on a setting screen. Below, the display content of each display area is explained.

The image display area 41 is an area which displays the image which is the subject of evaluation. The spot frame 41a of the image display area 41 shows the portion assumed to be the main subject. The area displayed by the spot frame 41a is displayed as an enlarged image in the sub-display area 42. In this way, it is possible for the user to grasp which portion is assumed to be the main subject.

The histogram display area 43 is a display area of the histogram which shows the frequency distribution of the color gradation in the photographed image. At the lower side of this area, the indicator 43a which shows the position in the histogram of the portion assumed to be the main subject is displayed. By this means, it is possible for the user to confirm the distribution of the color cast, the color bias and the like of the photographed image.

The assist information display area 44 is an area which, for example in the case that blurring of an image occurs, displays a message suggesting making the shutter speed faster, increasing the photographic sensitivity or setting the blur correction mode or the like. In this way, it is possible for the user to obtain information concerning the specific operations and settings for photographing an optimal image. Further, in the assist information display area 44, a message with specific numerical values, such as "increase the sensitivity to ISO 800" may be displayed.

The evaluation result display area 45 is an area which displays the evaluation results of the image displayed in the image display area 41. As mentioned above, points are added corresponding to respective evaluation items for the evaluated image. Here, the display indicates not points but, for example, five grades from A to E. By means of such a display, it is possible to provide the user with the evaluation results of an image in a form which is easy to understand. Further, points of the evaluation results, converted to points where 100 is a full score, may also be displayed.

The exposure condition display area 46 is an area which displays an exposure correction value and white balance correction value. In the case that the evaluation results relating to exposure of a photographed image are low, for example if there are many regions of overexposure (whiteout), a recommended correction value for exposure correction to the underexposure side is displayed in the exposure correction area 46a. Further, if there are many regions of underexposure (blackout), a recommended correction value for exposure correction to the overexposure side is displayed in the exposure correction area 46a. Further, in the case that the white balance value at a face position is outside of the suitable range, a recommended correction value for restoring this value to a suitable range is displayed in the white balance correction area 46b. In this way, the user can know the correction values necessary for the exposure correction as specific numerical values.

The focus location display area 47 is an area which shows the focusing state at the position of the main subject. Here, in the evaluation of the focus of Step S108 of FIG. 2, in the case that back focus or front focus were judged, a suggestion is displayed to fine tune the focus position of the autofocus to approach the front or rear. In FIG. 25, an example displaying the adjustment amount and adjustment direction (front direction plus, rear direction minus) is shown. By this means, it is possible for the user to understand the cause of bad focus, and in addition, can know to what extent it should be adjusted.

In addition to the above embodiment, the edge portions evaluated for focus and blurring, for example, may be displayed on the image display area 41 as a peaking display, so that the user can understand the focus and blurring conditions at one glance. Further, the color coordinates of the face portion may be displayed on the sub-display area 42, so that the white balance conditions may be visually understood.

Furthermore, in the exposure correction, even if the evaluations of the overexposure (whiteout) and underexposure (blackout) are suitable, in some cases the exposure of the main subject may be unsuitable. At such times, the assist information display area 44 may carry out a suggestion display to change the settings of the gradation control.

Moreover, in the above explained embodiments, the image evaluation screen shown in FIG. 25 suggests settings and operations for photographing optimal images. Because of this, the actual settings and operations are carried out through a separate setting screen or the like. For example, the adjustment of the autofocus position is set and registered by selecting autofocus fine tuning setting screen.

The camera 1 according to embodiment 1 has the effects described below. Further, the camera 1 according to embodiment 1, in addition to the effects described below, has various effects stated in the embodiments.

(1) The evaluations are made based on the changes in chronological sequence in the characteristics in the photographic frame when pluralities of image frames are imaged. Because of this, compared to a method which evaluates an image by noting the partial characteristics of an image of a face or the like, it is possible to comprehensively evaluate the entirety of an image. As a result, it is possible to carry out better image evaluation.

(2) Image information stored in the buffer 25 is evaluated as characteristic amounts of the motion vectors arising in the frame of each block when the photographed image is segmented into a plurality of blocks; thus the case of photographing moving subjects in particular can be effectively evaluated.

(3) The image information stored in the buffer 25 may be evaluated as a characteristic amount of the defocus amount generated between frames of each block when segmenting the photographed images into a plurality of blocks. In this case, an effective evaluation may be carried out for the case of desiring to photograph an image where focusing in particular is prioritized.

(4) The image information stored in the buffer 25 is evaluated based on the characteristic amounts of the motion vectors and defocus information, and on the position of the main subject. Because of this, a more comprehensive evaluation can be carried out. In this case, a more effective evaluation can be carried out in particular for the case of photographing people as the main subject.

(5) The body side microcomputer 21 adds the evaluation results of an evaluated image as additional information and stores this in the buffer 25. Because of this, it is possible to refer to the evaluation results not only when photographing, but also after photographing.

(6) When selecting at least one image whose evaluation result points are equal to or greater than a predetermined threshold value, from among a plurality of images stored in the buffer 25, this image and its evaluation results (or these images and their evaluation results) remain in the buffer 25, and when the evaluation results for the other images are deleted from the buffer 25, unnecessary image data can be reduced, and thus the storage area of the buffer 25 can be effectively used.

(7) When an evaluation item which requires correction is present among the evaluation results in a plurality of images stored in the buffer 25, when this condition is corrected at the time of imaging at the sensor 7 based on this evaluation item, it is possible to reduce the images having low evaluations. In particular, it is possible to prevent the photographing of many images having low evaluations in the case that pluralities of images are continuously photographed at once.

(8) When analyzing the evaluation results of the images stored in the buffer 25, extracting the correction information for increasing the evaluation results of these images, and displaying this correction information on the display panel 28, it is possible to make suggestions to the user for photographing better images. In this way, by not only providing feedback of the evaluation results to the user, but also suggesting hints and advice for photographing better images, it is possible for the user to photograph images with higher evaluations.

Embodiment 2

Next an explanation is given of an example of the application of the image evaluation apparatus according to the present invention applied to a camera where the lens is built into the camera body, or integrated with the camera body. Further, in the following explanation, the portions which are the same as those of embodiment 1 are explained assigning the same reference numbers.

2. Embodiment 2
2.1 Constitution of the Camera

Figure 26:
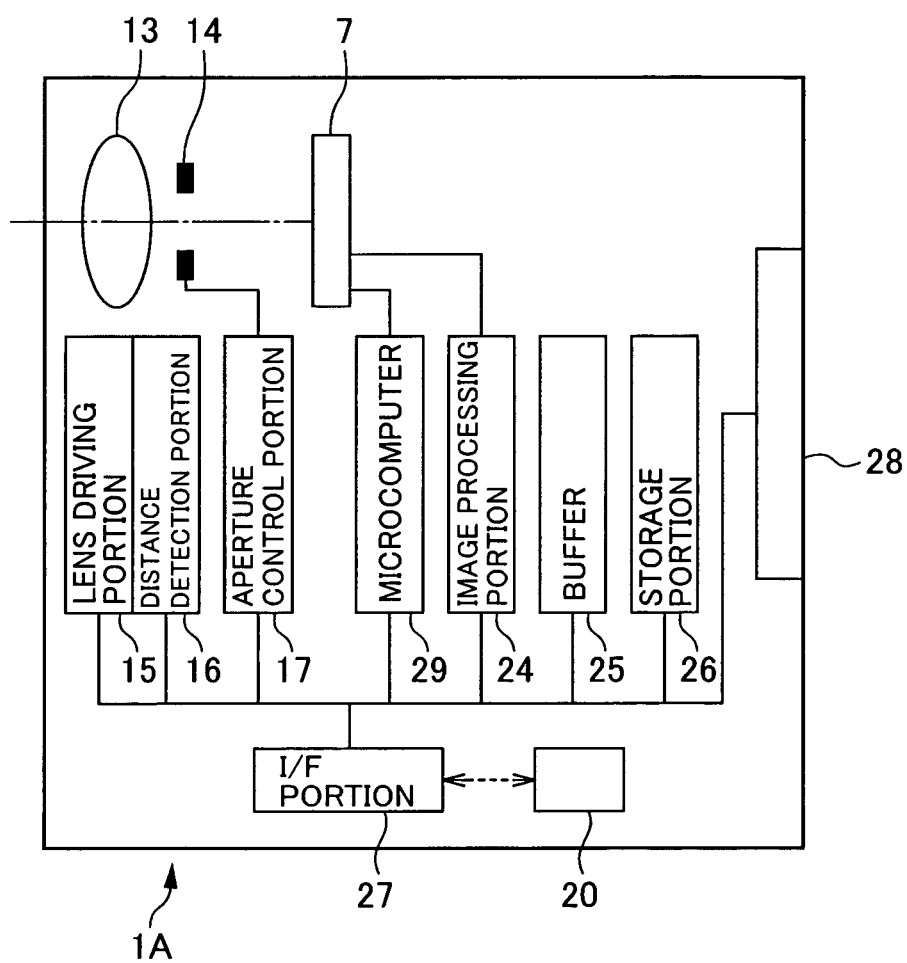
FIG. 26 is a block diagram showing the functional constitution of the camera according to embodiment 2.

FIG. 26 is a block diagram showing the functional constitution of a camera according to embodiment 2. In the camera 1A shown in FIG. 26, the operations of each portion relating to the focus adjustment, photometry, and exposure are controlled by a single microcomputer 29. Further, the imaging sensor 7 is provided with functions not only for photometry (exposure), but also for focus detection, and as an electronic shutter. Accordingly, the microcomputer 29 in the present embodiment is provided with functions as the focus detection portion 22 and the shutter control portion 23 of FIG. 1.

2.2 Concerning the Imaging Procedure and Operation

Figure 27:
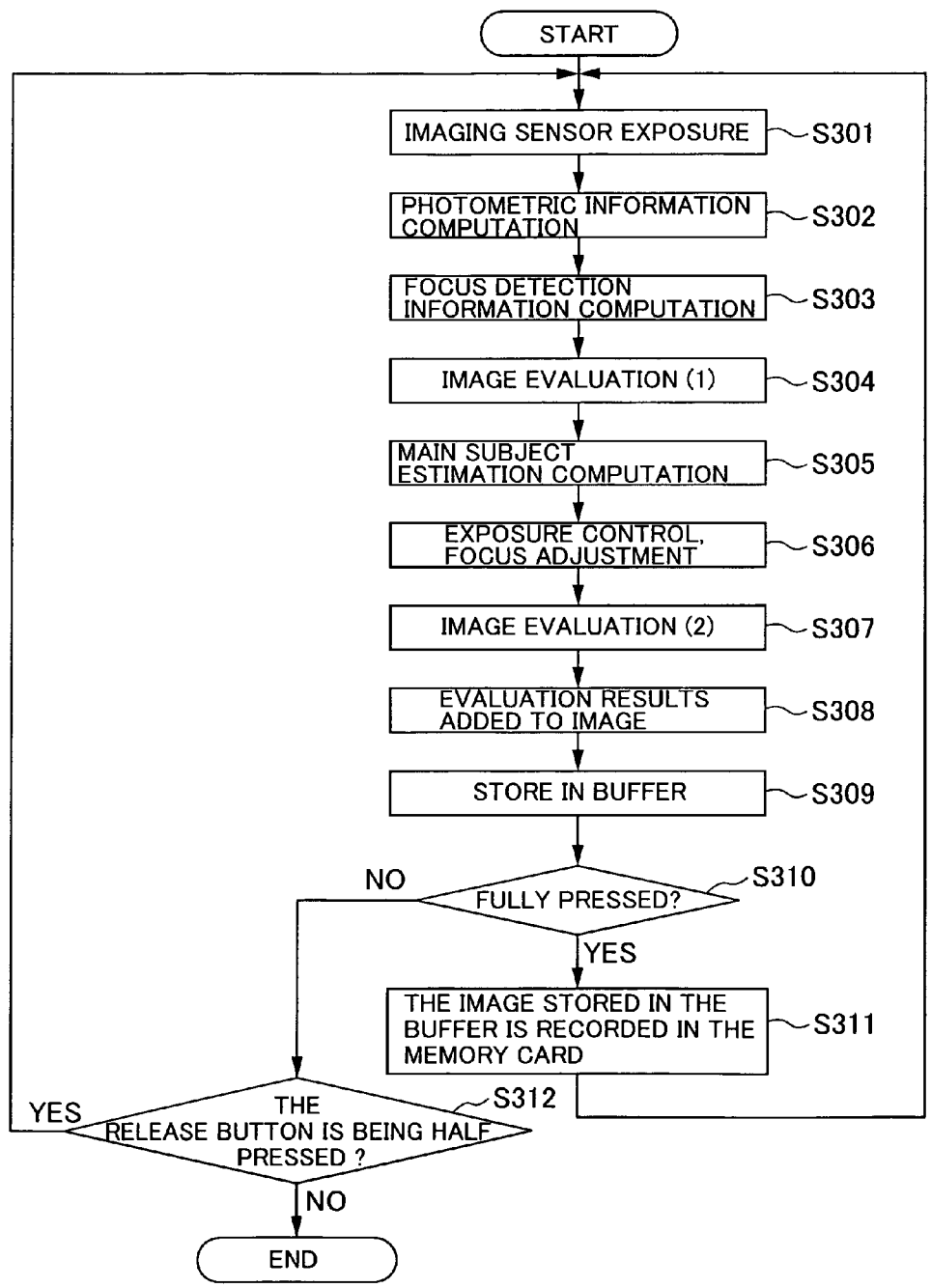
FIG. 27 is a flowchart showing the procedures from photographing to storing of the image in embodiment 2.

Next, an explanation is given referring to the flowchart of FIG. 27 of the series of the procedures from the photographing of an image to the storage, in the camera 1A of the embodiment 2 constituted as described above. The processing of the flowchart shown in FIG. 27 is executed by the microcomputer 29. The processing based on this flowchart is started when the user selects the item of the image evaluation mode from a setting screen, not illustrated, and then half presses the release button, not illustrated. In the following explanation, processing which is the same as that for embodiment 1 is shown with the step numbers corresponding to those of embodiment 1, and overlapping explanations are omitted.

In Step S301, the microcomputer 29 images (exposes) an image at the imaging sensor 7. Here, the imaged image is output to the image processing portion 24 as an image signal.

The processing of the microcomputer 29 in Step S302 to Step S305 is the same as the processing of Step S103 to Step S106 in FIG. 2.

In Step S306, the microcomputer 29 carries out the exposure computations considering the luminance of the main subject together with the luminance information calculated in Step S302, using the location of the main subject sought in Step S305. The microcomputer 29 determines the aperture value and shutter speed based on the suitable exposure value sought by the exposure computation. Then, the microcomputer 29 carries out the aperture adjustment controlling the aperture control portion 17 based on the aperture value. Further, the microcomputer 29 adjusts the exposure amount at the imaging sensor 7 based on the shutter speed.

In Step S307, Step S308, and Step S309, the processing of the microcomputer 29 is the same as the processing of Step S108, Step S113, and Step S114 of FIG. 2.

In Step S310, the microcomputer 29 judges whether the release button, not illustrated, is fully pressed. If the judgment in Step S310 is NO, the microcomputer 29 proceeds to Step S312. If the judgment in Step S310 is YES, the microcomputer 29 proceeds to Step S311. In Step S311, the microcomputer 29 records in the memory card 20 the image stored in the buffer 25.

The camera 1A, is provided with a photography mode which records an indicated number of images in the interval between the half press of the release button until the full press of the release button. The present flowchart shows the processing for the case of selecting this photography mode. In this photography mode, even while the release button is half pressed, images are continuously recorded, thus it is necessary to ensure the storage capacity of the buffer 25. Because of this, the microcomputer 29 deletes old images from the buffer 25 in the order of time elapsed since recording, when a predetermined number of images stored in the buffer 25 is exceeded. In this way, a predetermined number of images is constantly recorded in the buffer 25. Then, the microcomputer 29, when the release button 25 is fully pressed, stores in the buffer 25 a number of images before the full press, and a predetermined number of images after the full press. The microcomputer 29, in the case that the full press of the release button is released, stores in the memory card 20 the images stored in the buffer 25.

In Step S312, the microcomputer 29 judges whether the release button is being half pressed. If the judgment in Step S312 is NO, the processing of the present flowchart is finished. On the other hand, if the judgment in Step S312 is YES (here, full pressing is also included), the microcomputer returns to Step S301.

The camera 1A according to embodiment 2 has the same effects as embodiment 1. Further, it is also possible to similarly apply the evaluation methods and learning functions explained for embodiment 1. However, there will be partial differences in the processing sequence and content arising from the structural differences with a single lens reflex camera.

Modifications

The present invention is not limited to the embodiments explained above, and may be subjected to various changes and modifications as shown below, and these are also within the scope of the present invention.

In embodiment 1, the evaluation of an image is carried out during the half press of the release button. In contrast, it is also possible to carry out only the various computations necessary in the evaluation of an image during the half press of the release button, and carry out the evaluation of an image stored in the buffer 25 after the full press of the release button.

In embodiment 1, a constitution is shown wherein the lens driving portion 15 is provided inside the lens barrel 3. In contrast, the constitution may be such that the lens driving portion 15 is provided at the camera body 2. In this case, the driving power of the lens driving portion 15 is transmitted to the photographic lens 13 via a coupling, not illustrated. Further, the control of the lens side microcomputer 18 may be executed by the body side microcomputer 21.

Furthermore, the evaluation may be increased for an image where the absolute distance (length) from the peak frequency positioned furthest from the origin (the origin point of the histogram distribution from which motion components of the camera such as hand shake and the like have been deleted from each histogram distribution) and the origin, among the positions in the histogram distribution coordinates of the peak frequencies in the histogram distribution of the motion vectors, is relatively large compared to the other images. In this way, is it possible to increase the evaluation of images where the subject suddenly changes in the picture (movement, changes in shape, and the like). To specifically explain this using a drawing, for example in FIG. 18A the peak frequency C is the peak frequency most separated from the origin, and therefore, the absolute distance in this image becomes the length connecting the origin and the peak frequency C in a straight line. Further, while not illustrated, in the case that there were another image forming a histogram having a peak frequency at a position a further distance from the origin than the peak frequency C, this image would be evaluated with a relatively higher evaluation.

The image evaluation apparatus according to the present invention may also be installed on a personal computer. This personal computer is provided with, in addition to a monitor apparatus displaying the image, an I/F portion which inputs image files to a memory card via a communication line.

Further, embodiments 1 and 2, and the modifications and changes, may be used in appropriate combinations thereof, but detailed explanations thereof are omitted here. Further, the present invention is not limited by the above embodiments.

What is claimed is:

1. An image evaluation apparatus comprising:
a storage portion which stores a plurality of images when a photographing area of a camera has continuously imaged in a predetermined time interval a plurality of frames of a subject in the photographing area of the camera, and
an image evaluation portion which evaluates a plurality of the images stored in the storage portion, based on a characteristic amount showing a state in which the subject in the photographing area changing in chronological sequence, when the plurality of the images is imaged, wherein:
the image evaluation portion, from a plurality of the images stored in the storage portion, calculates as the characteristic amount a frequency distribution of motion vector arising between frames of each segmented region when each image is segmented into a plurality of segmented regions, and also carries out the evaluation based on similarity between the frequency distribution of first motion vectors in a region including a center area of the image, and a model frequency distribution of the motion vectors set beforehand as an evaluation standard of a preferable image in the region including the center area of the image, the region including the center area of the image being a part of the image and not including an entire image, and
the image evaluation portion calculates as the characteristic amount the frequency distribution of the motion vectors for a region in the vicinity of the center of the image, which has similarity of a color to a region and is not background, and which has continuity of the color with that region.

2. The image evaluation apparatus according to claim 1, wherein:
the image evaluation portion evaluates an image stored in the storage portion based on the characteristic amount, and the main subject estimated from the image.

3. The image evaluation apparatus according to claim 1, wherein:
the image evaluation portion converts the frequency distribution of the motion vectors and the model frequency distribution of the motion vectors into respective two dimensional graphs, and also segments developed regions of the two dimensional graphs into a plurality of segmented regions, calculates an absolute value of a frequency difference for each corresponding segmented region for the frequency distribution of the motion vectors and the model frequency distribution of the motion vectors set beforehand as an evaluation standard of a preferable image, which have been converted into two dimensional graphs, and takes the sum of the absolute values as the similarity.

4. An image evaluation apparatus comprising:
a storage portion which stores a plurality of images when a photographing area of a camera has continuously imaged in a predetermined time interval a plurality of frames of a subject in the photographing area of the camera, and
an image evaluation portion which evaluates a plurality of the images stored in the storage portion, based on a characteristic amount showing a state in which the subject in the photographing area changing in chronological sequence, when the plurality of the images is imaged, wherein:
the image evaluation portion, from a plurality of the images stored in the storage portion, calculates as the characteristic amount a frequency distribution of motion vector arising between frames of each segmented region when each image is segmented into a plurality of segmented regions, and also carries out the evaluation based on similarity between the frequency distribution of the motion vectors and a model frequency distribution of the motion vectors set beforehand as an evaluation standard of a preferable image, and the image evaluation portion deletes motion components of a back ground area included in the frequency distribution of the motion vectors.

5. An image evaluation apparatus comprising:

a storage portion which stores a plurality of images when a photographing area of a camera has continuously imaged in a predetermined time interval a plurality of frames of a subject in the photographing area of the camera, and an image evaluation portion which evaluates a plurality of the images stored in the storage portion, based on a characteristic amount showing a state in which the subject in the photographing area changing in chronological sequence, when the plurality of the images is imaged, wherein:

the image evaluation portion, from a plurality of the images stored in the storage portion, calculates as the characteristic amount a frequency distribution of motion vector arising between frames of each segmented region when each image is segmented into a plurality of segmented regions, and also carries out the evaluation based on similarity between the frequency distribution of first motion vectors in a region including a center area of the image, and a model frequency distribution of the motion vectors set beforehand as an evaluation standard of a preferable image in the region including the center area of the image, the region including the center area of the image being a part of the image and not including an entire image, and the image evaluation portion updates the model frequency distribution of the motion vectors set beforehand as an evaluation standard of a preferable image, based on a trend of the frequency distribution of the motion vectors of an image selected by a user, from among the images subjected to the evaluation.

* * * * *